US011696644B2

(12) United States Patent
Brandtner et al.

(10) Patent No.: US 11,696,644 B2
(45) Date of Patent: Jul. 11, 2023

(54) UPHOLSTERED FURNITURE INCLUDING MOLDED FURNITURE COMPONENTS

(71) Applicant: Ashley Furniture Industries, LLC, Arcadia, WI (US)

(72) Inventors: Timothy A. Brandtner, Ettrick, WI (US); Nicholas J. Robinson, Ettrick, WI (US)

(73) Assignee: ASHLEY FURNITURE INDUSTRIES, LLC, Arcadia, WI (US)

( * ) Notice: Subject to any disclaimer, the term of this patent is extended or adjusted under 35 U.S.C. 154(b) by 0 days.

(21) Appl. No.: 17/481,151

(22) Filed: Sep. 21, 2021

(65) Prior Publication Data

US 2022/0071398 A1 Mar. 10, 2022

Related U.S. Application Data

(63) Continuation-in-part of application No. PCT/US2021/022645, filed on Mar. 16, 2021, and a (Continued)

(51) Int. Cl.
*A47C 4/02* (2006.01)
*A47C 7/24* (2006.01)
(Continued)

(52) U.S. Cl.
CPC ................ *A47C 7/24* (2013.01); *A47C 4/028* (2013.01); *A47C 5/12* (2013.01); *A47C 7/30* (2013.01);
(Continued)

(58) Field of Classification Search
CPC .. A47C 1/02; A47C 4/028; A47C 5/12; A47C 17/16; A47C 17/02
(Continued)

(56) References Cited

U.S. PATENT DOCUMENTS 1,716,176 A 6/1929 Vitez-Keresztfalvy
1,772,979 A 8/1930 Bell
(Continued)

FOREIGN PATENT DOCUMENTS

RU 00117082 10/2019
RU 00117086 10/2019
WO WO 2018/081471 A1 5/2018

OTHER PUBLICATIONS

International Search Report for Application No. PCT/US2019/044000 dated Nov. 26, 2019, (4 pages.
(Continued)

*Primary Examiner* — Rodney B White
(74) *Attorney, Agent, or Firm* — Christensen, Fonder, Dardi & Herbert PLLC

(57) ABSTRACT

An upholstered chair, recliner, or sofa with a frame including a pair blowmolded hollow arm rest forms, wherein frame members extend between the forms. Further components may be blowmolded such as a backrest. The arm rest forms and backrest may be reinforced with metal plates and assembled into a recliner. The connections to the arm rest forms providing a geometrically rigid and robust frame that is weighs less, is quicker to assemble, and is more robust. Upholstery sacks are easily attached to the frame.

20 Claims, 34 Drawing Sheets

Related U.S. Application Data continuation-in-part of application No. 16/525,539, filed on Jul. 29, 2019, now Pat. No. 11,122,907.

(60) Provisional application No. 63/039,445, filed on Jun. 15, 2020, provisional application No. 62/990,287, filed on Mar. 16, 2020, provisional application No. 62/711,168, filed on Jul. 27, 2018.

(51) Int. Cl.
*A47C 7/30* (2006.01)
*B68G 7/00* (2006.01)
*A47C 5/12* (2006.01)
*A47C 31/02* (2006.01)
*A47C 17/02* (2006.01)
*B29C 49/00* (2006.01)

(52) U.S. Cl.
CPC .............. *A47C 17/02* (2013.01); *A47C 31/02* (2013.01); *B29C 49/00* (2013.01); *B68G 7/00* (2013.01); *A47C 4/02* (2013.01)

(58) Field of Classification Search
USPC .......................................... 297/440.1–440.23
See application file for complete search history.

(56) References Cited

U.S. PATENT DOCUMENTS 2,829,707 A 4/1958 Liebson
2,838,100 A 6/1958 Follows
3,030,146 A 4/1962 Faxon
3,036,864 A 5/1962 Arai
3,104,913 A 9/1963 Faulkner et al.
3,115,093 A 12/1963 Andrus
3,183,036 A 5/1965 Hill
3,333,841 A 8/1967 Damiano
3,375,861 A 4/1968 Marlow
3,414,912 A 12/1968 Dusey, Sr. et al.
3,423,772 A 1/1969 Mainguy
3,467,433 A 9/1969 Lindau et al.
3,497,883 A 3/1970 Arnold et al.
3,498,598 A 3/1970 Rathbun
D217,910 S 6/1970 Harman
3,528,096 A 9/1970 Moberg
3,642,323 A 2/1972 Taylor
3,658,382 A 4/1972 Anderson
3,669,495 A 6/1972 Von Rudgisch
3,690,723 A 9/1972 McClain et al.
3,700,282 A 10/1972 Rowland
3,722,954 A 3/1973 Rey et al.
3,874,727 A 4/1975 Mehbert et al.
3,877,087 A 4/1975 Harty
3,887,234 A 6/1975 Curtis et al.
4,067,073 A 1/1978 Komarov
4,074,919 A 2/1978 Watts
4,077,517 A 3/1978 Hilemn
D250,502 S 12/1978 Trimble
4,165,902 A 8/1979 Ehrlich
4,285,080 A 8/1981 Kitchen et al.
4,285,544 A 8/1981 Zapf
4,523,787 A 6/1985 Robinson
4,588,227 A 5/1986 Austin
4,601,516 A 7/1986 Klein
4,632,459 A 12/1986 Herschlag
4,768,833 A 9/1988 Virtue
4,775,187 A 10/1988 Herr
4,828,324 A 5/1989 Putnam
4,848,839 A 7/1989 Galardo
5,000,512 A 3/1991 Laird
5,080,438 A 1/1992 Moyer
5,265,939 A 11/1993 Self et al.
5,411,316 A 5/1995 Lovegrove et al.
5,423,596 A 6/1995 Laughlin et al.
5,447,005 A 9/1995 Giannuzzi
5,575,533 A 11/1996 Glance
5,582,460 A 12/1996 Schultz
5,601,340 A 2/1997 Stout
5,678,897 A 10/1997 Prestia
5,727,849 A 3/1998 Nelson
5,738,414 A 4/1998 Wieland et al.
5,755,489 A 5/1998 Rossman et al.
5,775,778 A 7/1998 Riley et al.
5,795,028 A 8/1998 Dussia, Jr. et al.
5,890,767 A 4/1999 Chang
D425,338 S 5/2000 Schlichter et al.
6,109,687 A 8/2000 Nye et al.
6,241,312 B1 6/2001 Watts et al.
6,241,317 B1 6/2001 Wu
6,367,874 B2 4/2002 Casini
6,367,880 B1 4/2002 Niederman et al.
6,474,738 B1 11/2002 Ratza et al.
6,679,558 B2 1/2004 Adams et al.
6,702,391 B1 3/2004 Stipek
6,796,614 B1 9/2004 Paul
6,827,407 B2 12/2004 Niederman et al.
D501,340 S 2/2005 Grossman et al.
6,854,806 B2 2/2005 Huse
6,883,873 B2 4/2005 Haney et al.
6,942,298 B2 9/2005 Harrison
6,945,178 B1 9/2005 Nye et al.
7,011,787 B2 3/2006 Huse
7,070,243 B1 7/2006 Frank
7,134,728 B1 11/2006 Buhrman
7,252,339 B2 8/2007 Owens
7,300,111 B2 * 11/2007 Huang ..................... A47C 4/02
297/440.16
7,434,304 B2 * 10/2008 Owens ..................... A47C 7/42
29/434
7,438,362 B2 10/2008 Dotta et al.
D595,819 S 7/2009 Davis
D595,820 S 7/2009 Davis
7,568,767 B2 8/2009 Richardson
7,713,011 B2 5/2010 Orszagh et al.
7,744,162 B2 * 6/2010 Griggs, Jr. ............. A47C 4/028
297/440.16
7,806,482 B2 10/2010 Dotta et al.
7,922,253 B2 4/2011 Chen
7,988,236 B2 8/2011 Brandtner
8,322,792 B2 12/2012 Chen
8,322,793 B2 12/2012 Chen
8,356,954 B2 1/2013 Koch
8,438,716 B2 5/2013 Brandtner
8,448,314 B2 5/2013 Brandtner
8,646,843 B2 * 2/2014 Koch ..................... A47C 4/028
297/440.14
8,764,115 B2 7/2014 Brandtner
8,777,319 B2 7/2014 Brandtner et al.
8,783,778 B2 7/2014 Nelson et al.
D726,469 S 4/2015 Dix
9,028,003 B2 5/2015 Yeh
9,028,185 B2 5/2015 Eggers et al.
9,309,914 B2 4/2016 Yuan
9,345,330 B2 5/2016 Andrade
9,474,381 B2 10/2016 Brandtner et al.
9,526,342 B2 * 12/2016 Thuma ................ B29C 49/0031
9,609,943 B1 4/2017 Lin
9,651,080 B2 5/2017 Eggers et al.
9,839,295 B2 12/2017 Robinson et al.
9,839,298 B2 12/2017 Stirling
10,034,554 B2 7/2018 Lewis et al.
10,117,521 B2 11/2018 Lewis et al.
10,188,212 B2 1/2019 Thuma et al.
10,299,606 B2 5/2019 Lewis et al.
10,327,557 B2 6/2019 Neil et al.
10,512,338 B1 12/2019 Hawkins et al.
10,653,248 B2 * 5/2020 Lewis .................... A47C 17/02
10,869,560 B2 12/2020 Gates et al.
11,122,907 B2 * 9/2021 Brandtner ................ B68G 7/00
11,178,973 B2 11/2021 Nelson et al.
2003/0209934 A1 11/2003 Haney et al.
2004/0041452 A1 3/2004 Williams
2004/0095000 A1 5/2004 Durling
2004/0212240 A1 10/2004 Zwezdaryk

(56) References Cited

U.S. PATENT DOCUMENTS

| | | | |
|---|---|---|---|
| 2005/0067876 | A1 | 3/2005 | Dortch |
| 2005/0225153 | A1 | 10/2005 | Ou |
| 2008/0185897 | A1 | 8/2008 | Griggs |
| 2009/0235451 | A1 | 9/2009 | Gorkin |
| 2011/0035875 | A1 | 2/2011 | Brandtner |
| 2011/0117355 | A1 | 5/2011 | Selle |
| 2011/0215630 | A1 | 9/2011 | Grove |
| 2012/0146364 | A1 | 6/2012 | Hoffman et al. |
| 2012/0146382 | A1 | 6/2012 | Griggs, Jr. |
| 2012/0204392 | A1 | 8/2012 | Luangphon |
| 2012/0217784 | A1 | 8/2012 | Griggs, Jr. |
| 2013/0147244 | A1 | 6/2013 | Carter, III |
| 2013/0316123 | A1 | 11/2013 | Preisler et al. |
| 2013/0320741 | A1 | 12/2013 | Brandtner et al. |
| 2014/0103695 | A1 | 4/2014 | Griggs, Jr. |
| 2014/0139000 | A1 | 5/2014 | Ogg |
| 2014/0239679 | A1 | 8/2014 | Griggs, Jr. |
| 2014/0375103 | A1 | 12/2014 | Lejcher et al. |
| 2015/0130233 | A1 | 5/2015 | Thuma et al. |
| 2015/0305504 | A1 | 10/2015 | Robinson et al. |
| 2016/0106219 | A1 | 4/2016 | Stirling |
| 2019/0254440 | A1 | 8/2019 | Gates et al. |
| 2020/0029699 | A1 | 1/2020 | Brandtner et al. |
| 2021/0289941 | A1 | 9/2021 | Brandtner et al. |
| 2022/0071398 | A1 | 3/2022 | Brandtner et al. |

OTHER PUBLICATIONS

Admitted prior art dated at least as early as Jul. 20, 2018 3 pgs.

Sofas Chairs Recliners Sectionals [online], [site visited Feb. 22, 2022], Available from internet URL: https://www.millersfurniture.com/why-choose-smith-brothers-berne-at-millers-furniture/ (Year: 2022).

International Search Report for Application No. PCT/US21/22645, dated Jul. 27, 2021 (6 pages).

Written Opinion of the International Preliminary Examining Authority for International Application No. PCT/US2021/022645, dated Apr. 13, 2022 (5 pages).

* cited by examiner

UPHOLSTERED FURNITURE INCLUDING MOLDED FURNITURE COMPONENTS

This application is a continuation-in-part of U.S. patent application Ser. No. 16/525,539 filed Jul. 29, 2019, now U.S. Pat. No. 11,122,907, which claims priority to U.S. Provisional Application No. 62/711,168 filed on Jul. 27, 2018; this application is also a bypass continuation-in-part of PCT/US2021/022645, filed on Mar. 16, 2021, which claims priority to Provisional Application No. 62/990,287 filed Mar. 16, 2020, and also claims priority to Provisional Application No. 63/039,445 filed Jun. 15, 2020. All of said applications are incorporated by reference herein in their entireties.

FIELD OF THE DISCLOSURE

The present disclosure generally relates to upholstered furniture and, more particularly, upholstered furniture including one or more molded components.

BACKGROUND OF THE DISCLOSURE

Upholstered seating furniture where essentially the entirety of the exposed furniture items are covered by upholstery coverings is one of if not the highest volume items sold in the residential retail furniture markets and thereby provides one of the highest revenue sources for retail furniture stores. The market for such upholstered seating furniture is fiercely competitive and any improvements in manufacturing resulting in an improved product, better value to the customer, and/or lower manufacturing costs are welcomed by the industry.

In the manufacture of such upholstered seating furniture items, such as sofas, love seats, recliners, and similar items, the structure for the upholstered furniture items is provided by a frame or chassis, which gives the furniture structural support and also provides its basic shape. Traditionally, frames for upholstered furniture items have been typically constructed of wood materials, such as hardwood, softwood, engineered woods (for example, plywood, hardboard, millboard, chipboard, and fiberboard). Portions of the wooden frame may typically be covered by padding or cushioning, such as foam, and then covered with fabric, leather, synthetic fabric, faux leather, microfiber, or other upholstery. Due to the large number of parts and the weight of their materials, wooden furniture frames are often heavy and have long assembly times due, in part, to the large number of parts they include. For example, a single arm alone for upholstered chairs, recliners, and sofas can include up to and over 10 or 15 different wood parts not including the multitude of fasteners needed for assemble. Each wood part, of course, needs to be precisely cut. Further, a single backrest for a chair or recliner can include up to and over 10 or 15 different wood parts not including the multitude of fasteners.

Additionally, attaching upholstery to the complex shape of wooden sofa frame arms also can be painstakingly tedious in that the wooden frames have gaps that need to be covered with cardboard or the like, the upholstery components, including padding, does not slide on the wood frame for positioning and as such, the upholstery needs to be precisely positioned by hand. Any improvement in ease of attaching upholstery components to sofa frame arms would be well received by furniture manufacturers.

Moreover, due to non-uniformity of wood, the use of multiple wood pieces in constructing sofa and chair components, such as arms, is only as strong as the weakest wood piece and can present difficult quality control issues. Moreover, wood pieces can crack when fasteners, are driven into the pieces during assembly of the furniture item.

The above-described process of manufacturing upholstered furniture items is time consuming and costly due to the number of parts must be manually assembled to construct the final upholstered furniture item. As such, there is a need for a simplified method for manufacturing upholstered furniture items that reduces labor and material costs while providing a product that provides a sufficient or improved level of support and comfort to the user.

Although there have been efforts to utilize plastic components in seating furniture, such efforts have not been commercially successful with regard to upholstered seating furniture and have not taken advantage of the respective attributes and disadvantages of plastic and wood.

SUMMARY

The embodiments of the present disclosure include upholstered seating furniture in which the number of components that need to be assembled is minimized, that is simpler to assemble, where the time for assembly is minimized, and where the finished product is robust and sturdy. The inventors have identified an optimal and synergistic use of polymer structural components and non-polymer structural frame components, such as wood frame members, to provide such attributes.

In embodiments, an upholstered seating furniture item configured as a sofa includes a seat base with seating cushions, a cushioned back rest and a pair of arm rests with padding. The seat base, the cushions, the pair of arm rests all covered with upholstery on all visually exposed regions, specifically the top and sides of the sofa. The sofa having a sofa frame or chassis including a pair of blow molded arm rest forms separated by a separation distance, and a plurality of spanning wood frame members, each of the plurality of spanning wood frame members extending between the pair of molded arm rests, each spanning wood frame member having a length greater than the separation distance and having wood frame member ends nested within recesses in the respective blow molded arm rest forms. Each spanning wood frame member received in recesses extending open upwardly or forwardly or rearwardly. In embodiments, the recesses may be configured as four sided pockets or slots open upwardly, forwardly, or rearwardly, the slot dimensioned to provide an interference fit with the thickness of ends of the spanning wood frame members such that the spanning wood frame members are forced into their final seating position. A feature and advantage of embodiments is that with the ends of the spanning wood frame members retained in the pockets or slots with an interference fit eliminates or minimizes the need for further fasteners to attach the spanning wood frame members to the polymeric arm rest forms. Particularly where such spanning members are secured to other wood frame members.

A feature and advantage of embodiments, is the blow molded arm rest forms may be positioned a fixed distance apart in an assembly jig and a plurality of spanning wood frame members may be positioned in place on the blow molded arm rests by installing the spanning wood frame members without moving the arm rest forms, that is without adjusting the distance between the blow molded arm rests. In embodiments, spanning wood frame members include a wood lower forward or front rail defining a forward lower margin of the sofa frame and a wood lower back rail defining a back lower margin of the sofa frame. Each of the two ends of the lower front rail are received in recesses having three rail confronting wall portions, a forward facing wall portion, a downward facing wall portion, and an inward facing wall portion, that is, toward the opposite end of the front rail. Each of the two ends of the lower back rail are received in recesses having three rail confronting wall portions, a rearward facing wall portion, a downward facing wall portion, and an inward facing wall portion, "inward" meaning toward the opposite end of the lower back rail.

A feature and advantage of embodiments is a preassembled backrest frame may be placed on an assembly table and a pair of blow molded arm rest forms may be placed on each end of the preassembled backrest frame and the blow molded arm rest forms may be engaged with the preassembled backrest with ends of spanning frame members that extend from each end of the preassembled backrest frame. Specifically, the back side of the arm rest forms can be engaged with the ends of the lower back rail wood frame member at the recesses at the lower rear margin of the blow molded arm rest forms. Other ends of spanning wood frame members, for example a breast rail and a spring rail, can seat in slots or recesses with an interference fit. Bolts or screws can be inserted through the ends of the lower back rail spanning wood frame member into threaded fasteners embedded or attached to the rear face of the arm rest forms. The lower front rail can then be attached to the front of the arm rest forms at the lower inwardly positioned recesses with bolts or screws extending through the ends of the lower front rail into threaded fasteners embedded or attached to the wall of the arm rest forms at the wall defining the recess. The inventors have found that the ends of the breast rail and spring rail are adequately retained in slots defined by the wall of the arm rest forms and do not necessitate fasteners. Two spring rails may then be attached, one end to a forward spring rail on the forward lower rail and the rearward spring rail that is integrated with the preassembled backrest frame.

A feature and advantage of embodiments is that a single arm sofa may be assembled utilizing only one blowmolded are rest form with the backrest frame attached thereto. A feature and advantage of embodiments is that two mirror image blowmolded arm rests can be utilized to form different size seat frames, for example a full size sofa, a love seat, and a single seat chair, just by utilizing shorter spanning frame members and using the appropriate number of upright backrest frame members.

One or more of the plurality of wood frame members attached to each of the pair of blow molded arm rest forms by way of a plurality of metal screws extending into a plurality of metal threaded inserts in the respective arm rest forms. Vertical back rest frame members and seat deck components are supported by and attached to the spanning frame members. The upholstery covering the side arm rest forms, the back rest, and the cushions such that substantially the entirety of the exposed regions of the sofa are covered by the upholstering.

A feature and advantage of embodiments is a furniture item including a pair of opposing arm member forms each unitarily formed from a single piece of polymeric material. This structural arrangement provides ease of assembly and cost efficiencies by minimizing the number of parts and minimizing the number of assembly steps. In embodiments, wooden cross members extend between the pair of opposing arm member forms. In embodiments, each arm member defines a plurality of corresponding recesses, each of the corresponding recesses being dimensioned and positioned to receive an end portion of a wooden cross member. In embodiments, a plurality of threaded metal inserts are supported by each of the arm members. Each of the threaded metal inserts may receive a threaded fastener that aids in constraining a wooden cross member relative to the arm member.

A feature and advantage of embodiments is a pair of mirror image blow molded polymer arm rest forms each having a horizontal elongate through-slot extending most of the forward backward depth distance of the arm rests. The through hole providing enhanced structural integrity and facilitates attachment of upholstery and decking materials.

A feature and advantage of embodiments is a pair of mirror image blow molded polymer arm rest forms that receive a plurality of wooden cross members spanning between the forms. Each arm rest portion having an elongate horizontal through-slot extending forwardly and rearwardly. The wooden cross members and polymer arm rest portions defining a seat box for receiving a textile deck assembly. The textile deck assembly may have rearwardly extending straps to attach to a spanning spring rail member and lateral flaps to extend through the respective horizontal through-slots for attachment, such as by staples to the arm rest forms at the exteriorly facing wall surface. In embodiments, a cushion sheet material for covering the textile seat deck can lay on the deck and also have ends that extend through the respective through-slots and be attached to the arm rest forms such as by staples A feature and advantage of the blow molded arm rest forms is that fasteners such as Christmas tree polymer fasteners and expanding wing fasteners are readily accommodated by the thin wall structure of the arm rest forms. Recesses may be provided to seat the head of an expanding wing fastener flush with the surrounding wall surface or below the wall surface. A Christmas tree connector may be integrated into an upholstery panel to be pushed into place on the front face of an arm rest portion. Pre-placed holes positioned on recessed platforms hold the connectors under tension providing a secure fit of the upholstered piece.

A feature and benefit of embodiments is an upholstered furniture item have covering material in the form of an upholstery sack positioned over at least a portion of the upholstered furniture item, including each of the arm portions. In embodiments, the upholstery sack includes padding that provides a higher level comfort for users of the upholstered furniture item. In embodiments, the upholstered furniture item further includes a padding, wherein at least a portion of each of arm portions is covered by the padding, such that the pad is intermediate the molded component and covering material.

A feature and advantage of embodiments is a furniture item including a pair of opposing arm rest forms members, each of the arm members comprising a hollow body comprising a polymeric wall that extends continuously about a top side, two lateral sides, a forward side, a rearward side, and a bottom side. In embodiments the wall does not have an exposed edge of the wall thickness. The wall having an inward facing surface defining an interior with a void volume. The interior and void volume extending from a top side wall portion, two lateral side wall portions, a forward wall portion, a rearward wall portion, and a bottom wall portion. In embodiments, the continuous wall substantially defines an enclosed interior. In embodiments, the void volume is greater than about 1 $ft.^3$ and less than about 3.5 $ft.^3$.

In embodiments the polymeric arm rest forms have an outer wall surface having low coefficient of friction with respect to receiving upholstery coverings, particularly loose fitting upholstery coverings. In embodiments, the low friction polymeric outward facing surfaces provided by the polymeric shell wall facilitate the pulling of upholstery covering materials over the arm portions of the furniture item. The exterior surface may have less of a coefficient of friction with respect to wood frame members. In embodiments, the polymeric wall gives structural support and also provides a fundamental shape to the arm portions of the furniture item. In embodiments, the polymeric wall has structure defining recesses and slots. The recesses and slots can be sized to receive frame members. In embodiments, the wall portions defining the recesses and or slots can provide an interference fit on opposing sides of the frame member. A feature and advantage of embodiments is with such an interference fit the exterior surface of the wall portion at the recess engages an exterior surface of the frame member, which may be wood, and provides a relatively high coefficient of friction that may effectively retain the frame member within the recess or slot.

A feature and advantage of embodiments is a furniture item including an arm portion integrally formed from a single piece of thermoplastic material. This arrangement allows the arm portion body to be fabricated using an automated and efficient thermoplastic injection molding processes.

A feature and benefit of embodiments is a furniture item including an arm member having cross member receiving recesses that orient wooden cross members of the furniture. In embodiments, each of the cross member receiving recesses is shaped and dimensioned to receive an end portion of a wooden cross member while the wooden cross member is disposed in a predetermined orientation relative to the arm member. In embodiments, the arrangement facilitates fixture-less alignment and assembly of the subcomponents.

A feature and benefit of embodiments is a furniture item including an arm member having a plurality of mounting features. In these embodiments, the plurality of mounting features allow the arm member to be utilized in various types/models of furniture items. Examples of furniture items include sofas, loveseats, chairs, sectional sofas, seating units, sleeper sofas, futon frames, and recliners.

A feature and benefit of embodiments is a furniture item including an arm member defining a groove, the groove receiving the distal end of a cross member to form a tongue and groove joint. In embodiments, the groove extends upward and downward along a groove axis. In embodiments the groove is shaped and dimensioned to receive an end portion of a wooden cross member, an end portion of a wooden cross member having a uniform thickness along its length. In embodiments, a wooden cross member may be slid downward with each of the ends of the cross member being received in grooves defined by opposing arm member to facilitate fixture-less alignment and assembly of the subcomponents of a furniture item.

A feature and advantage of embodiment is a furniture item having blow molded arm rest forms with less than three layers of material between the arm rest form and the upholstery covering. In embodiments, the arm rest form has a top curved surface about a horizontal axis. In embodiments, the layers between the arm portion and the upholstery covering comprise an EVA underlayer and a second layer of fibrous material thereon. A feature and advantage is arm portion that does not have a cardboard layer extending across a wooden frame as in many conventional assemblies.

A feature and advantage of embodiments is a recliner which, compared to conventional recliners, the number of components needed to assemble the recliner is greatly reduced, the difficulty of assembly is greatly reduced, the time of assembly is greatly reduced, and the expense is correspondingly greatly reduced. Moreover the structural integrity is generally greater.

In embodiments, a method of making an upholstered seat includes providing a seat frame including a front frame member, an opposing back rest, and two arms at opposite ends of front frame member and backrest, wherein at least one of the front frame member and opposing back rest includes a wood component, and wherein the arms are made of molded plastic; coupling at least one of the arms is coupled to the wood component; and covering at least a portion of the at least one of the arms with a covering material.

A feature and advantage is that the inventors have discovered that utilizing certain polymers, such as polyethylenes, can received staples comparable to wood frame members. This facilitates utilization of the polymer arm rest forms in existing furniture assembly lines.

A feature and advantage of embodiments, a blow molded arm rest form may have a nominal wall thickness of from 2 to 6 mm. This thickness provides stabilization and secure holding of frame components connected thereto, while providing an arm rest form that is more resilient that a prior art wooded arm rest frame. In embodiments, the top wall portion of the arm rest form may be deflected more than 0.5 inches under loading, for example under a 100 lb. loading of a hand or foot of a person, and will return to the original position when the loading is removed, the arm rest form is not damaged. In embodiments, the top wall portion of the arm rest form may be deflected more than 0.75 inches in localized regions under loading, for example under a 100 lb. loading of a hand or foot of a person, and the localized region of the top wall will return to the original position when the loading is removed, the arm rest form is not damaged. In embodiments, each of the top side wall portion, the two lateral side wall portions, the forward side wall portion, the rearward side wall portion, and the bottom side wall portion may be deflected 0.5 inches and each said side will return to the original position without damage. In embodiments, each of the top side wall portion, the two lateral side wall portions, the forward side wall portion, the rearward side wall portion, and the bottom side wall portion may be deflected 0.75 inches and each said side will return to the original position without damage. In embodiments, each of the top side wall portion, the two lateral side wall portions, the forward side wall portion, the rearward side wall portion, and the bottom side wall portion may be deflected 1.0 inches and each said side will return to the original position without damage. Such resilience can reduce the amount of cushioning material needed compared to conventional wood framed arm rest form and can provide an increased measure of safety over a wood framed arm rest when, for example, an individual inadvertently collides with or falls onto the arm rest.

A feature and advantage of embodiments is that front to back spanning wood boards have been eliminated. The pair of blow molded arm rest forms and a pair of metal spring seat stretchers are the only front to rear structural members.

A feature and advantage of embodiments is that the pair of blow molded arm rest forms each have a forward face of a significant area to interface with the lower front rail, and each have a rearward face of a significant area to interface with a forward face of a lower rearward rail. These interfaces provide a high degree of rigidity to initially position the arm rest portions and lower spanning frame members in a precise rectangular geometry when initially assembled and secure that rectangular geometry during assembly, transportation, and ultimately use for the life of the sofa. A feature and advantage is that rectangular structural rigidity, when viewed from above, the rectangle in a horizontal plane, is provide by only four structural components, each component a unitary component, the components attached together with threaded fasteners.

A feature and advantage of embodiments, is the entire laterally outward wall surface of each polymer arm rest form is comprised of a single unitary closed wall with no apertures extending through the wall. A feature and advantage of embodiments, is the entire laterally inward wall surface of each polymer arm rest form is comprised of a single unitary closed wall with no apertures extending through the wall.

A feature and advantage of embodiments, a blow molded arm rest form may have a nominal wall thickness of from 2 to 3.5 mm, where the arm rest form does not carry the majority of the loading of persons or pets on the sofa seat. A feature and advantage of embodiments, a blow molded arm rest form may have a nominal wall thickness of from 2 to 3.5 mm, where upright portions of the arm rest form does not carry the majority of the loading of persons or pets on the sofa seat.

In embodiments, attachment of the upholstery is simplified by the very low coefficient of friction between the sofa arm form and the upholstery material, allowing conformingly sized upholstery arm portions to be readily slid over the arm forms. In embodiments, this facilitates construction of more complete upholstery kits at locations remote from the final sofa assembly site of the sofa. For example, upholstery kits can include arm rest sock portions that already have arm rest padding attached to the upholstery covering material. This can eliminate the steps of manually having to attach one or more layers of padding at the final sofa assembly site before attaching the arm rest upholstered portions.

A feature and advantage of embodiments is that segregation of manufacturing sites for components of the upholstered seating furniture items is enhanced. For example, padding for arm rests can be attached to arm rest upholstery portions as part of an upholstery kit in remote locations from the final seating furniture assembly location. Additionally, the arm rest forms may each be molded at a location remote from the final seating furniture assembly location and transported to the final seating furniture assembly location.

A feature and benefit of embodiments is an arrangement for furniture items in which the number of components that need to be assembled is minimized, is simple to assemble and the time for assembly is minimized, and is robust and sturdy.

A feature and advantage of embodiments is that the specific attributes of polymers and wood have been combined in a synergistic fashion for construction of a wood frame or chassis for upholstered seating furniture. For example, conventional polymers suitable for geometrically large components, such as furniture components, for example polyethylenes, when subjected to tensile loading or significant sheer loading may creep over time and may loose load carrying strength and may effectively collapse. Although, three-dimensional polymer forms, particularly hollow polymer forms have reasonable compressive load carrying capabilities depending on loading. That is downward weight loading will not generally cause noticeable creep of the polymer making certain polymers such as polyethylenes suitable for arm rest forms. The inventors have discovered where such arm rest forms are utilized for some limited downward compressive loading, any diminishment of the strength of the polymer over time should not affect the integrity of the sofa frame and sofa. The inventors have discovered that a thin walled blow molded arm rest provides Polymers have great capabilities and flexibilities in securing components, such as wood frame members that are not continually loaded. In embodiments of the invention, no loading from seating is isolated on the polymer arm rest forms, rather the loading is carried directly downward from the seating deck to a lower front rail and a lower back rail that are both positioned at the lower margin of the sofa. Where there are no feet on the sofa, the loading from seating will be transferred to the floor surface along the length of both the front rail and back rail. Where, there are feet on the sofa, the front rail and rear rail will act as end supported beams, and the floor engaging feet will be positioned under the ends of the front and rear rail and transfer the seating load to the floor by way of the feet.

Wood has great load carrying capability between supported ends when properly oriented. The use of wood spanning frame members to support the weight of people sitting on sofas in association with the polymer arm rest forms provides more than sufficient strength to support people sitting on the sofa, and provides same with minimal component parts, minimal assembly time, and potentially reduced cost. An optimal solution is to minimize load carrying of large blow molded components and allow the wood components to transfer a majority of carried load to the floor. In embodiments seat load carrying components transfer seat loading from occupants to a lower front rail that has a lower edge defining the lower margin of the sofa frame, and a lower back rail with a lower edge also at the lower margin of the sofa frame.

A feature and advantage of embodiments is the use of a plurality of spanning wood frame members between a pair of polymer arm rest forms, where seating load carrying spanning wood frame members seat on upwardly facing surfaces of the polymer arm rest. In embodiments the upwardly facing surfaces are load carrying platforms portions formed in an inner wall portion of hollow arm rest form whereby the seating load transferred to the platform portions by ends of the spanning wood frame members is distributed to the inner facing wall portion above, below, forwardly and rearwardly of the platform portion. In embodiments, the spanning frame members may be formed of metal rather than wood with some of the same advantages.

A feature and advantage of embodiments is that a plurality of spanning wood frame members extend between and are attached to a pair of spaced hollow polymer arm rest forms, each end of the spanning wood frame members received in a form fit recess, none of the recesses being a recess closed at the top, bottom, and two lateral sides.

A feature and advantage of embodiments are blow molded polymer arm rest forms that have a plurality of vertical recesses in the wall portions for adding structural strength to the arm rest form. A feature and advantage of embodiments is use of a polyethylene for arm rest forms, and with threaded inserts having an internal threaded surface placed at spanning member attachment points in polymer wall portions for receiving screws that extend through spanning frame members for securing the spanning frame members to the polymer arm rest forms. In embodiments, the threaded inserts have an external thread and are threaded into the polymer wall portions of the arm rest forms. In embodiments the spanning member attachment points are at recesses in the wall portions of the arm rest forms whereby an end of the spanning member will nest into the recess, the nesting providing secure fixation of the component with respect to the arm rest forms. In embodiments, the nesting is an inference fit between the end of the spanning frame member and the slot or recess. The spanning frame member end receiving slot defined by the wall portion being form fit, having a slot width at least at a seating position sized slightly smaller than the spanning frame member end width to provide a snug interference fit and retention of the spanning frame member end therein. The wall portion defining the slot may have a shoulder portion therein above the seating position of the spanning wall portion ends. The shoulder can define a narrowing of the slot to facilitate easy placement of the spanning frame member. In embodiments, a projection of the wall portion into the slot can provide a detent structure that can deflect inward when the end is slid into place and then return to the original position to provide a blocking or inhibition of the end moving out of the seating position.

A feature and advantage of embodiments is a polymer arm rest form that has an exterior surface that is deflectable throughout the surface upon impact that is greater than any deflection of a conventional wood arm rest frame. In embodiments, all exterior corners of the polymer arm rest form have a radius of 0.5 inches or greater defined by the curvature of a corner wall portion providing deflection upon impact and a more blunt impact corner than conventional wood frame arm rest forms. In embodiments, all exterior corners of the polymer arm rest form defining the profile of the arm rest form have a radius of 0.75 inches or greater defined by the curvature of a corner wall portion.

A feature and advantage of embodiments is a furniture seating item with a rectangular base, with opposing side polymer structural supports defining opposing short sides of the polymer base and with wood base boards defining the long sides of the rectangular base, ends of the wood base boards connecting with the polymer structural supports, and wherein the rectangular base supports a seating platform, and a back rest, and wherein all load carrying components of the furniture seating item are connected directly to or connected by way of metal or wood components to at least one of the a forward and rearward non-polymer supports. In other words, none of the loaded components transfer any loading upon them exclusively to upright walls of the polymer structural supports, such loading is shared or primarily carried by the non-polymer frame structures. In embodiments, floor engaging feet are placed under the four ends of the wood base boards to support the loading of the seating item. By way of the feet, loading by sitting, other than at the sofa feet, there are no isolated upright wall structures polymer structures, such as legs, carrying the load of the furniture seating item.

In embodiments of the invention, arm rests for a stationary upholstered seating item such as a sofa, each have a hollow polymer arm rest form weighing from about 6 to 10 lbs, saving 10 to 16 pounds for both arm rest forms compared to conventional wood framed arm rest forms. In embodiments of the invention, recliner arm rest forms can save 14 to 19 pounds for two blow molded arm rests compared to conventional wood framed arm rest forms. In recliners, a 50% reduction in the weight from the arm rests is available by using blow molded polymer arm rest forms over conventional wood framed arm rests.

In embodiments of the invention, the inventors have facilitated utilizing hollow thin-walled, blow molded structures, such as chair arm rests, in load carrying applications by providing reinforcing means to the blow molded structures. Such reinforcing mean including metal or wood plates or beams inserted into receiving pockets formed in the blow molded structure. Axis of an elongate beam being arranged to be upright to provide enhanced load carrying support. In embodiments, the plane of a plate is positioned upright in a pocket defined in the blow molded structure for enhancing the load carrying capability. In embodiments, a hollow blow molded structure has a wood or metal reinforcing plate or beam on one lateral side of the blow molded structure and has another metal or wood load carrying structure on an opposite lateral side of the blow molded structure.

In embodiments, a blowmolded backrest form, such as for a recliner, can have metal reinforcing arms inserted within the blowmolded backrest form that attach to metal couplings for connecting with the recliner mechanism. The wall of the blowmolded backrest form may be sandwiched and compressed between the metal coupling and the reinforcing arms.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
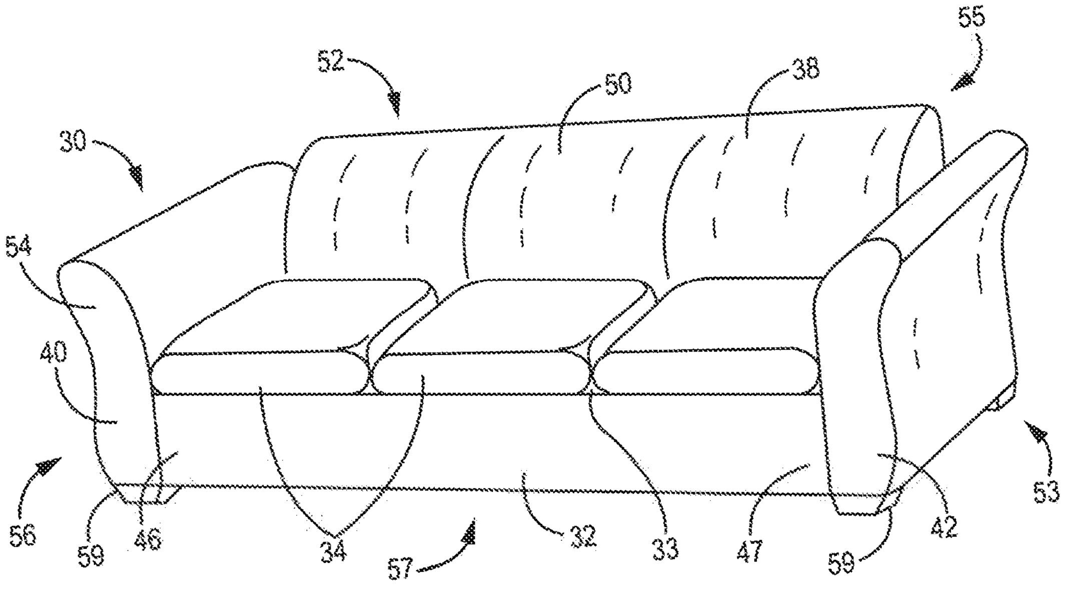
FIG. 1A is a perspective view of an upholstered sofa in accord with embodiments.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Referring to FIGS. 1A-1E, an upholstered sofa 30, love seat 31.1, single chair 31.3, single arm sofa 31.5, collectively "seats" and a recliner 31.7 are illustrated. The seats generally each have a seat base 32 with a seat deck 33, seat cushions 34 on the seat deck, an upright back rest 38 extending from the seat base, and a pairs of arm rests 40, 42 connecting to opposing ends 46, 47 of the seat base. Upholstery 50 covers exposed portions of the arm rests, seat base, back rest and cushions. That is the top side 52, left side 53, right side 54, back side 55, and front side 56 of the sofa has upholstery thereon. The bottom side 57 may have upholstery panels folded and attached to the frame but is generally not fully covered with upholstery. Feet 59 attach to the sofa at the bottom side and provide separation of the sofa base from a floor surface. When used herein, upholstery includes fabrics, leather, synthetic fabrics, faux leather, microfibers, or other sheet materials used as coverings for sofas.

Figure 1B:
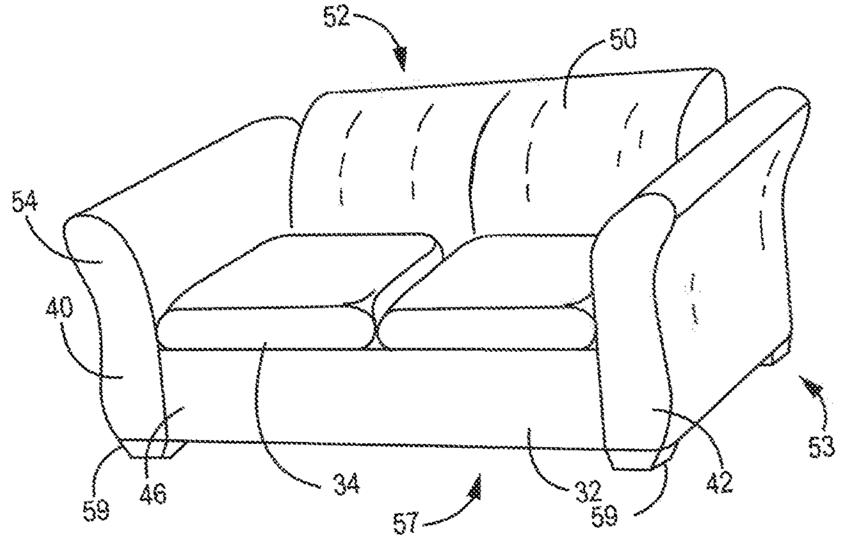
FIG. 1B is a perspective view of an upholstered love seat in accord with embodiments.
Figure 1C:
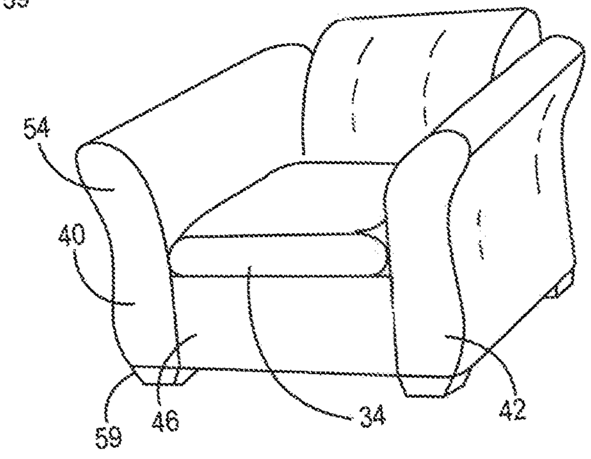
FIG. 1C is a perspective view of an upholstered single seat chair in accord with embodiments.
Figure 1D:
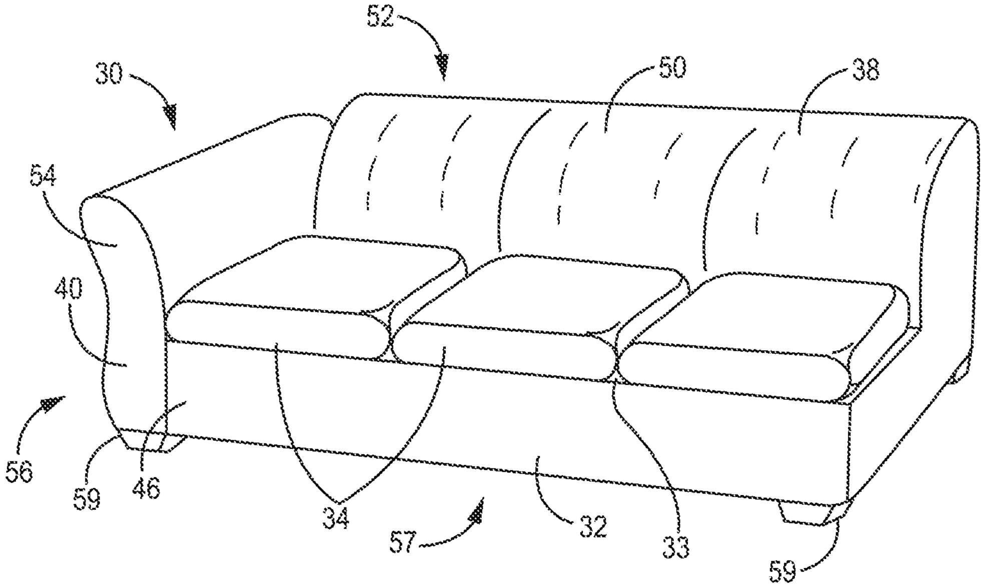
FIG. 1D is a perspective view of a single arm sofa in in accord with embodiments.
Figure 1E:
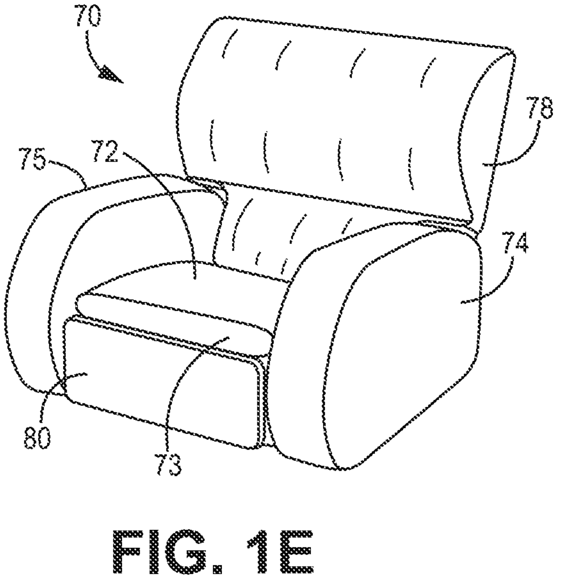
FIG. 1E is a perspective view of an upholstered recliner in accord with embodiments.
Figure 1F:
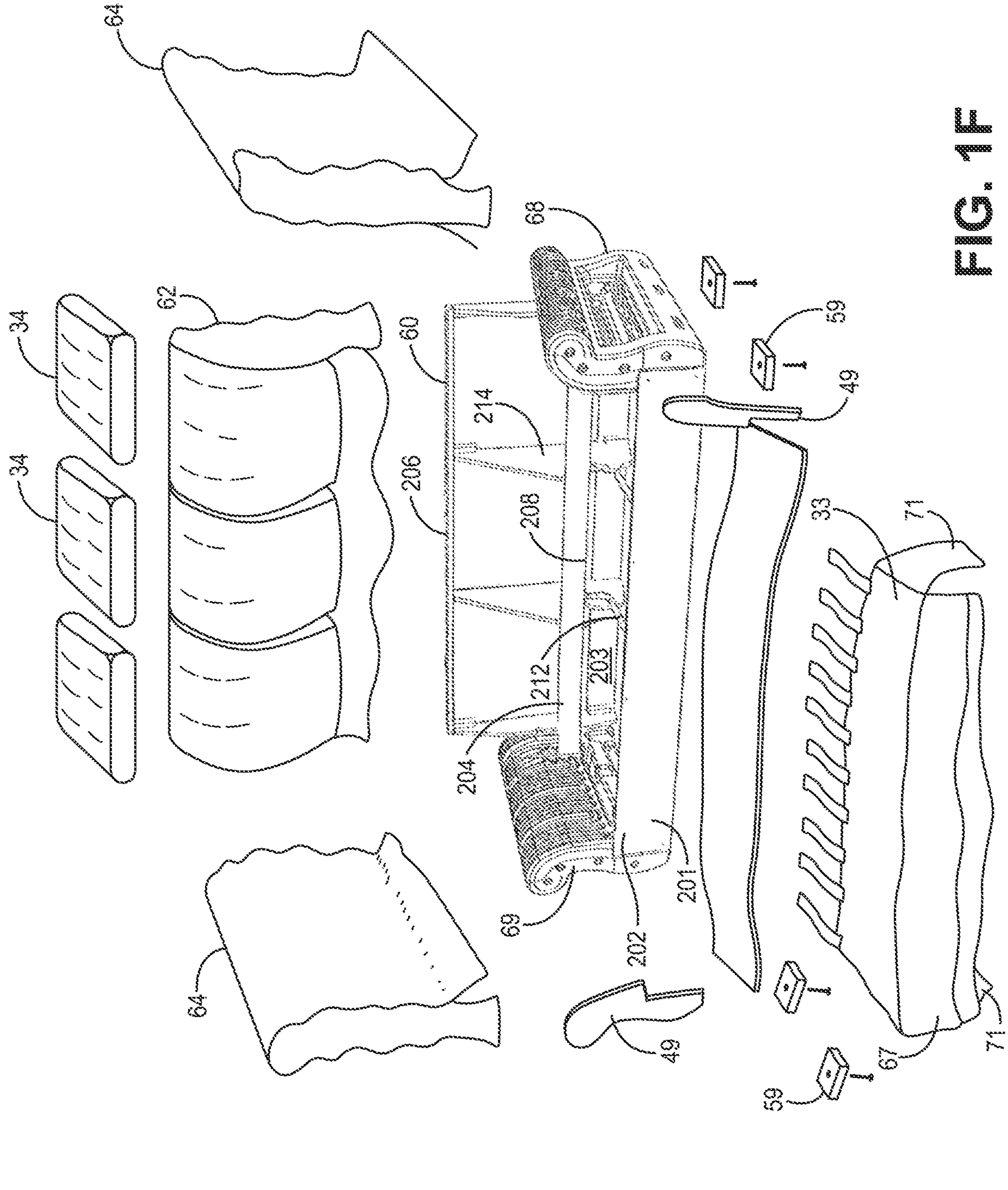
FIG. 1F is an exploded view of the sofa of FIG. 1A in accord with embodiments including two molded polymer arm rest forms.

Referring to FIG. 1F, further components of the sofa are depicted and include a structural frame 60, seat back upholstery portion 62, arm rest upholstery portions 64, 65, a forward base upholstery portion 67 attached to the seat deck 33. The seat deck may be a textile seat deck as described in WO 2018/081471 which is owned by owner of this application and is incorporated by reference herein for all purposes. Alternatively, the seat deck may comprise conventional steel springs as are well known. The structural frame 60 includes unitary polymer arm rest forms 68, 69 discussed in detail below. The love seat, single arm sofa, and single seat chair generally share these components in a reduced width.

Referring to FIG. 1E, the recliner 70 has a seat 72 with a seat cushion 73, a pair of arm rests 74, 75, a back rest 78, and an ottoman 80. Recliner frames are discussed below with reference to FIGS. 17-18B, 19A, and 19*b*.

Although in FIG. 1F, the back rest upholstery portion, the arm rest upholstery portions, and the base upholstery portions (in the sofa and the other seats) are depicted as separate upholstery components to be attached to the sofa frame, in embodiments they may be combined in an integrated upholstery covering with the separate portions connecting prior to installation on the sofa or recliner frame. In embodiments, upholstery for the sofa and recliner may be furnished as a kit, the kit manufactured at a location remote from a final assembly location of the sofa. When used herein, "portion" may be all of or part of something. Portion is not to be considered as limiting.

Figure 2A:
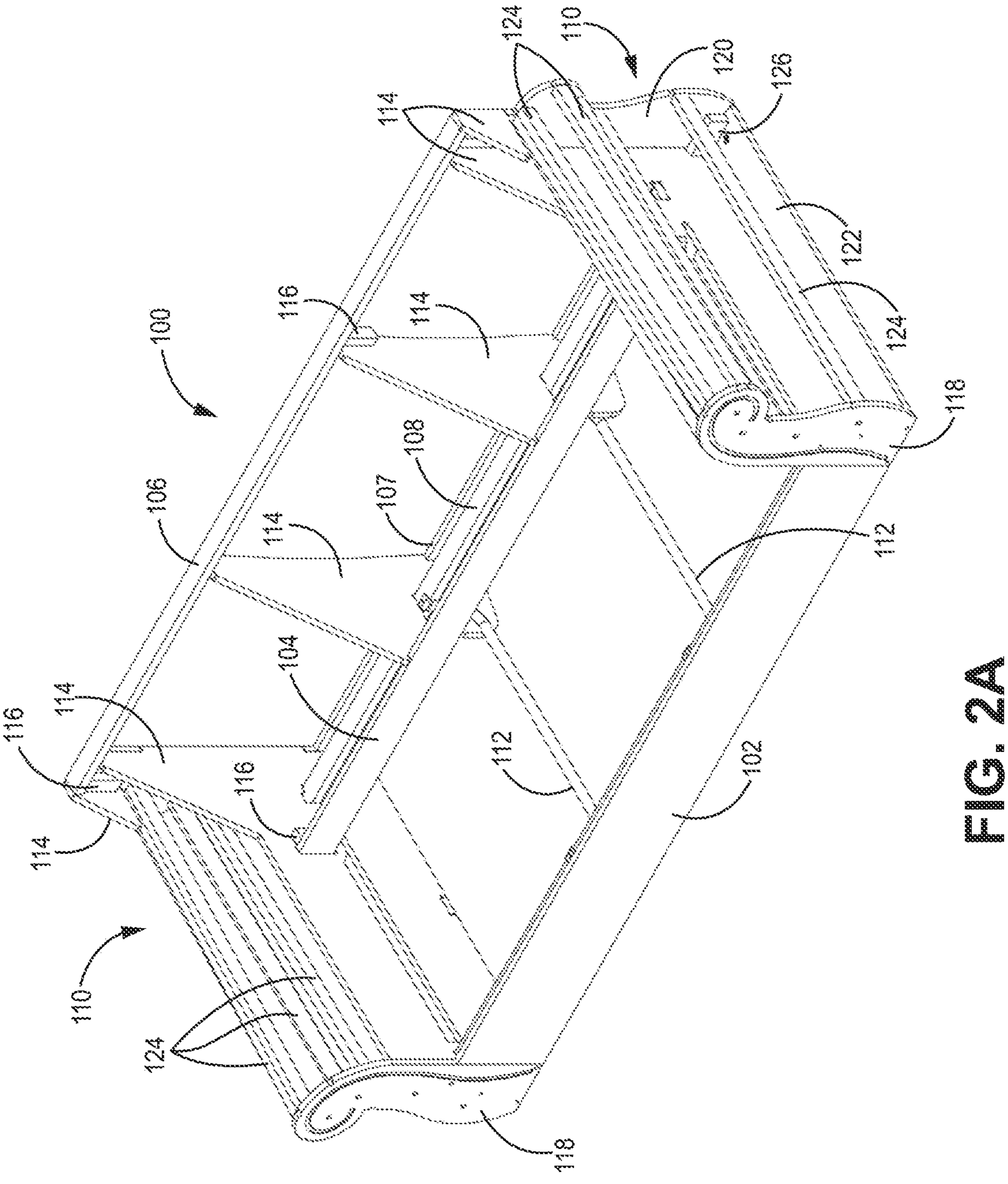
FIG. 2A PRIOR ART
FIG. 2A is a perspective view of a PRIOR ART sofa frame formed primarily from wood components.
Figure 2B:
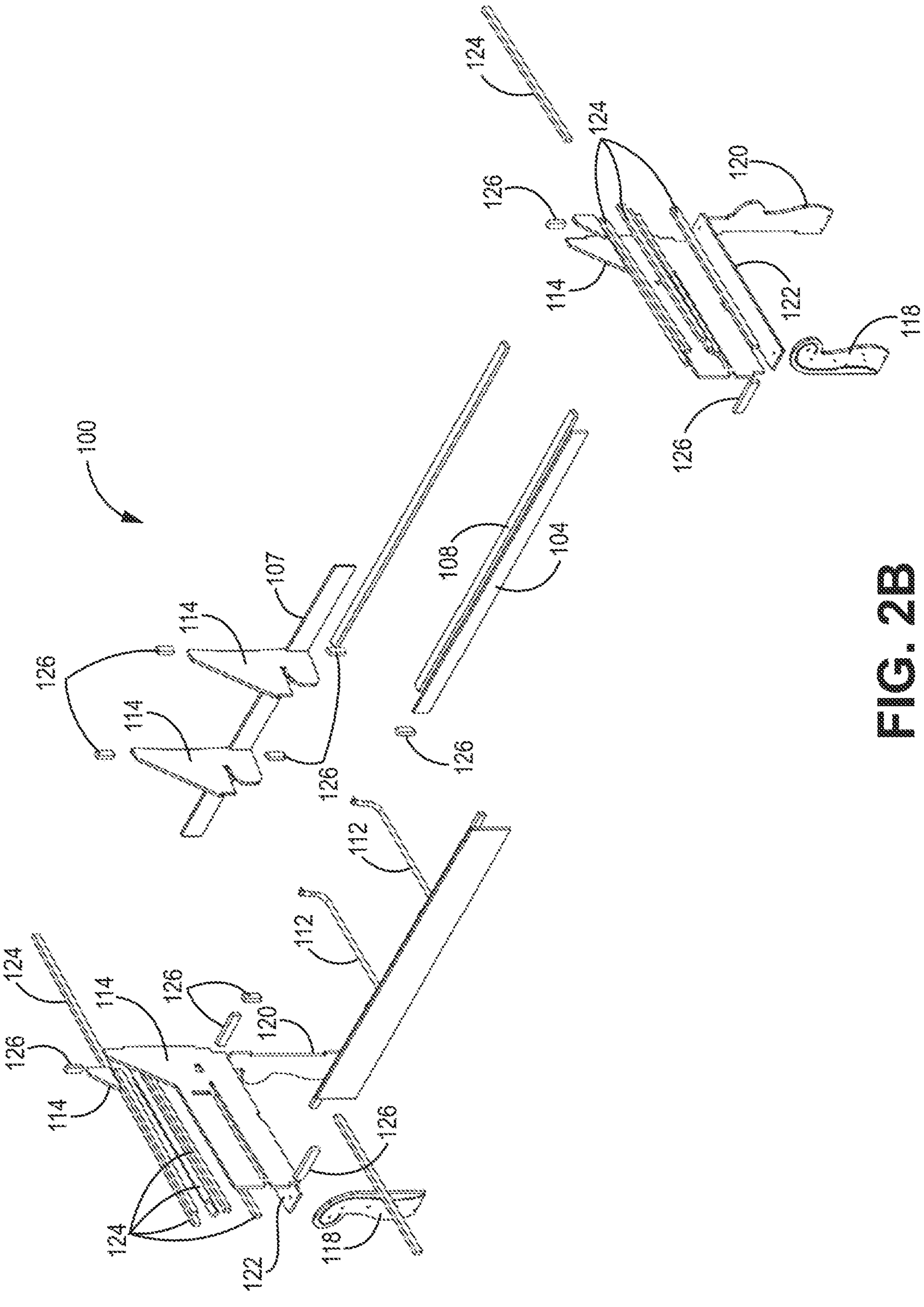
FIG. 2B PRIOR ART
FIG. 2B is an exploded view of the PRIOR ART sofa frame of FIG. 2A.

Referring to Prior Art FIGS. 2A and 2B, a wood structural frame 100 for a conventional sofa is depicted. Certain portions of frame 100 once assembled, such as arms portions, can be covered by cardboard or fiberboard for providing further shape and closing openings, and may be further covered with padding or cushioning, such as foam. Frame 100 can then be covered with fabric, leather, synthetic fabric, faux leather, microfiber, or other upholstery or covering materials. Such padding and covering materials are not depicted in FIGS. 1 and 2. As depicted, frame 100 includes dozens of different parts. These parts can include, for example, one or more lower front rails 102 (which can be made of oriented strand board or "OSB") forming a front of sofa frame 100, one or more rear or back rails, such as breast rail 104 (which can be made of oriented strand board or "OSB"), top back rail 106 (which can be made of hardwood or "HW"), lower back rail 107 and spring rail 108 (which can be made of hardwood or "HW"), forming a back of sofa frame 100. Frame 100 front and back portions can be connected by two arms 110 and one or more seat stretchers 112 (which can be made of metal). The back of frame 100 can further include one or more uprights 114 (which can be made of oriented strand board or "OSB") also forming a back of sofa frame 100. Frame 100 can include a plurality of tie blocks 116 (which can be made of hardwood or "HW") for connecting the components of frame 100 together and maintaining the proper positioning and angles of frame 100. The many wood components need to be precisely shaped by sawing or milling and are typically connected with fasteners, such as staples, and sometimes with adhesives.

Each of the prior art arm rest frames 110 can include a number of components, including a front post 118 and a back post 120 (which can be made of oriented strand board or "OSB") providing a shape to arms 110 connected by one or more leg rails 122 (which can be made of oriented strand board or "OSB") and one or more arm pulls 124 (which can be made of hardwood or "HW"). Each of the arm frames 110 can include one or more tie blocks 126 (which can be made of hardwood or "HW") for connecting the components of the arm together and maintaining the positioning and angles of arms 110. As depicted, each of arms 110 of sofa frame 100 includes up to or even over 10 or 15 parts that are connected with a multitude of fasteners such as staples. Upholstery for prior art sofa frames, particularly the arm rests, require individual attachment of several layers on the arm rest form at the final assembly facility. See, for example, U.S. Pat. No. 10,117,521 which is owned by the owner of the instant invention and application and is incorporated herein by reference for all purposes.

Referring to FIGS. 3A to 4A, the structural frames 60, according to embodiments of the present disclosure, include the two molded polymer components, specifically, the two arm rest forms 68, 69 for each of the seats except the frame for the one arm sofa. Frames 60, once assembled, can be covered by padding or cushioning, such as load poly, arm fiber, and/or foam, and can then covered with fabric, leather, synthetic fabric, faux leather, microfiber, or other upholstery or covering materials.

Figure 9:
FIG. 9 is a side elevation view of the upholstered panel of FIG. 8.
Figure 8:
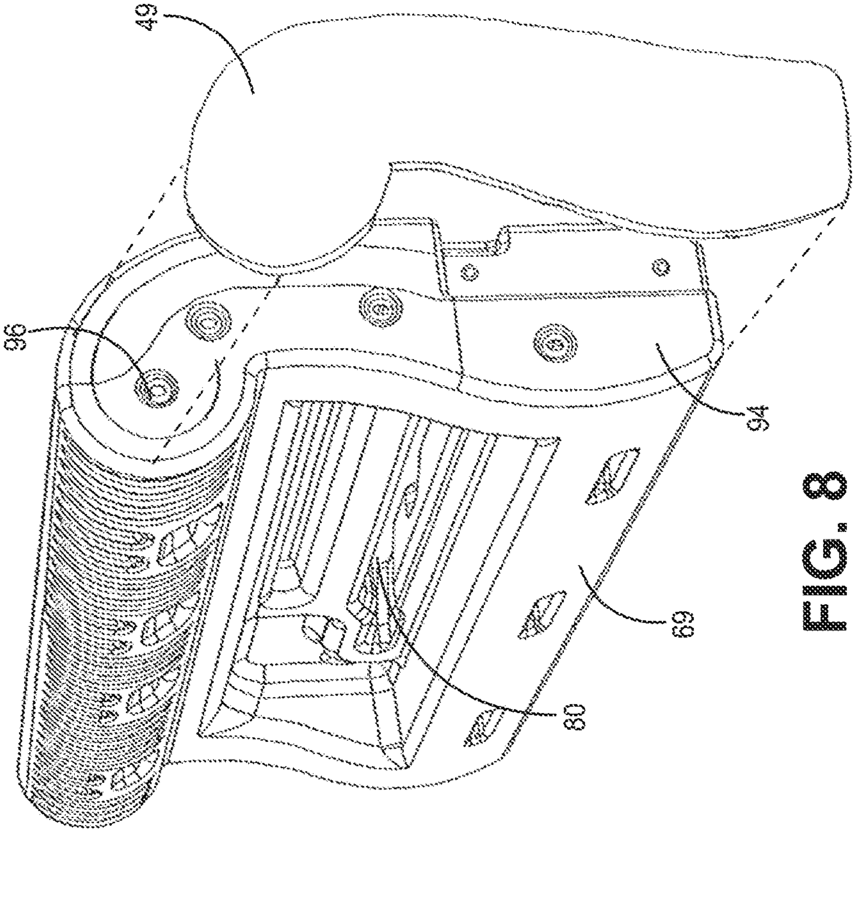
FIG. 8 is a perspective view of a sofa arm rest form and a cooperating upholstered panel for attachment thereto.
Figure 13:
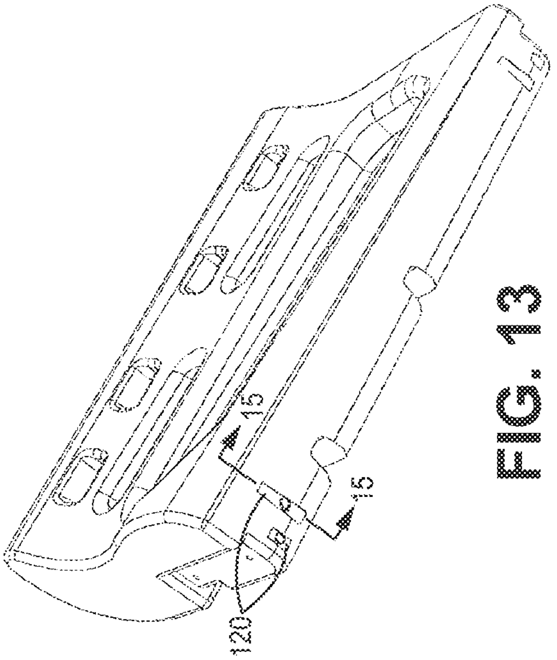
FIG. 13 is a bottom perspective view of the arm rest form of FIG. 12.
Figure 12:
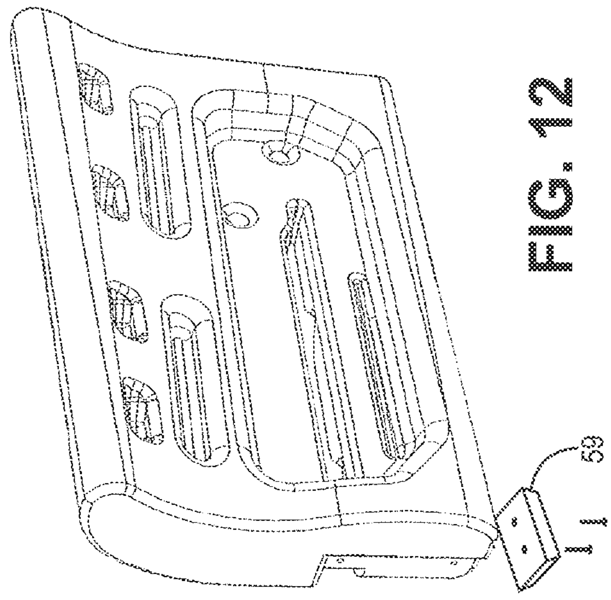
FIG. 12 is an arm rest form with a foot to be attached thereto.
Figure 14:
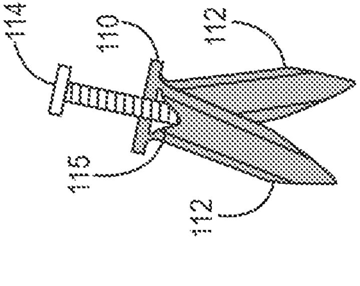
FIG. 14 is a perspective view of an expanding winged connector.

As depicted, frames 60 can include one or more spanning wood frame members 201 which may be configured as a lower front rails 202 (which can be made of oriented strand board or "OSB") forming a front portion of frame 60, a lower back rail 203, breast rail 204 (which can be made of oriented strand board or "OSB"), top back rail 206 (which can be made of hardwood or "HW"), and spring rail 208 (which can be made of hardwood or "HW") forming a back portion of frame 60. Spanning wood frame members 201 front and back are received in slots or recesses 207 defined in the wall portions of the two arm rest forms 210. The recesses 207 capture, restrain and positionally fix the ends 201.2 of the spanning wood frame members 201. Differently configured recesses 201.3 are illustrated in the arm rest forms. In embodiments, the wall portions defining slots including upwardly facing surfaces 207.3, that the spanning wood frame members seat on as part of seating positions 207.5, see in particular FIGS. 9 and 10. The recesses each have a seating position for the ends of the spanning frame members. In embodiments, the wall portions at the recesses have a single continuous wall 211 with bends that define the recess without an exposed wall edge. In embodiments, the wall thickness at the recesses is generally uniform and only the exterior surface of the wall is exposed at the recesses, generally, other than a fastener opening, there is not an opening into the interior of the arm rest form.

Figure 3A:
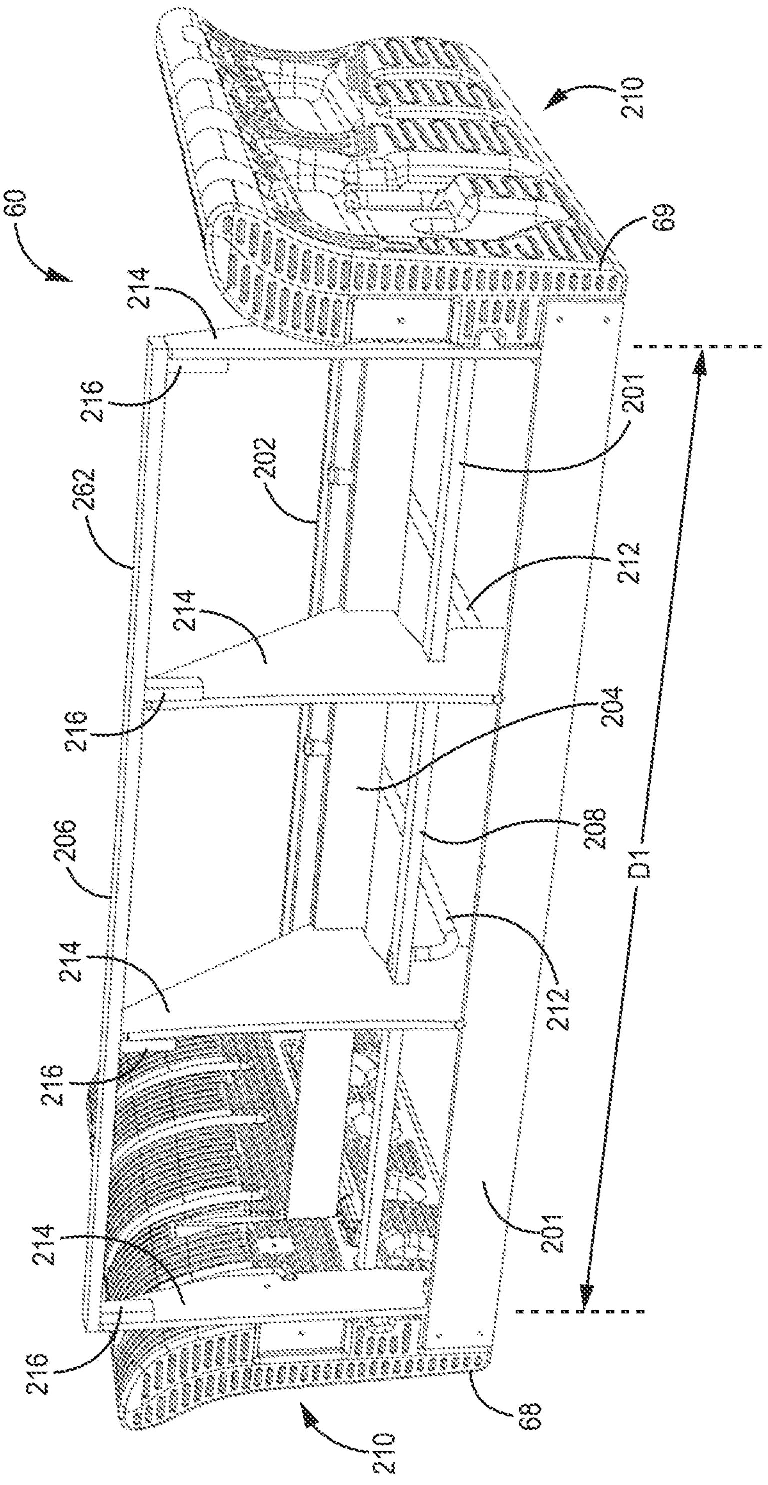
FIG. 3A is a perspective view of the rearward side of a sofa frame in accord with embodiments.
Figure 3B:
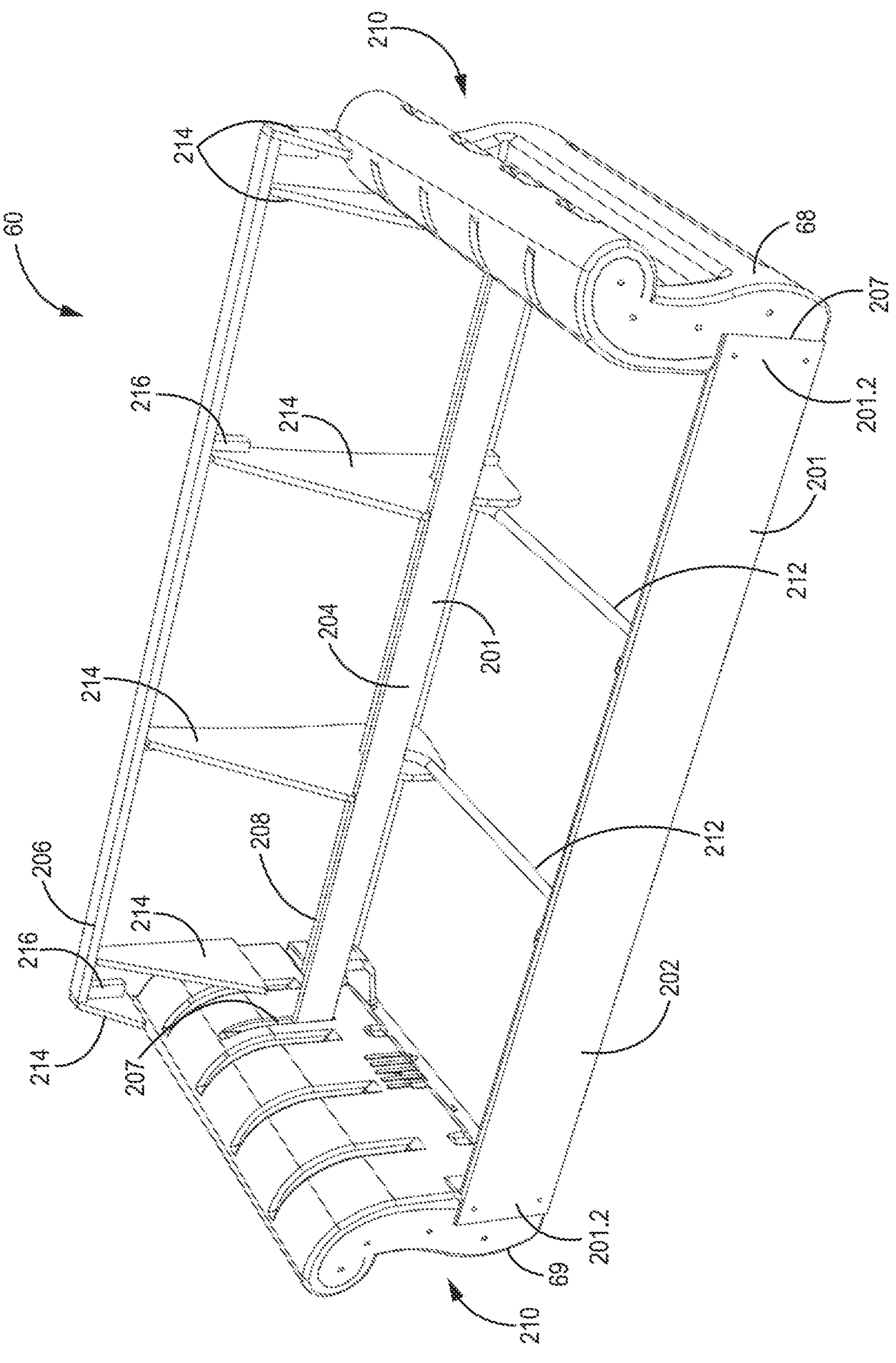
FIG. 3B is a front perspective view of another sofa frame according to embodiments.
Figure 3C:
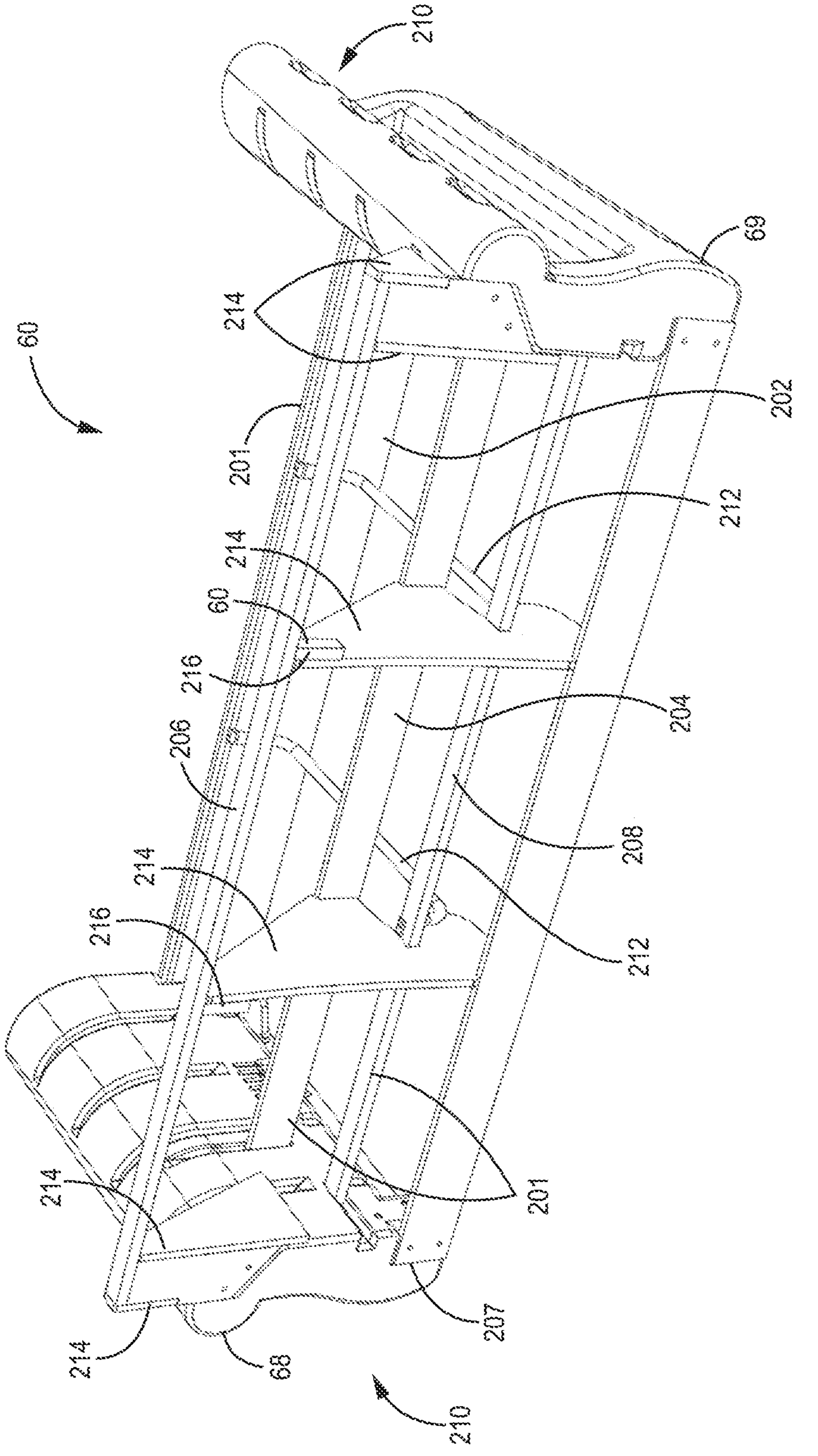
FIG. 3C is a rear perspective view of the sofa frame of FIG. 3B.
Figure 3E:
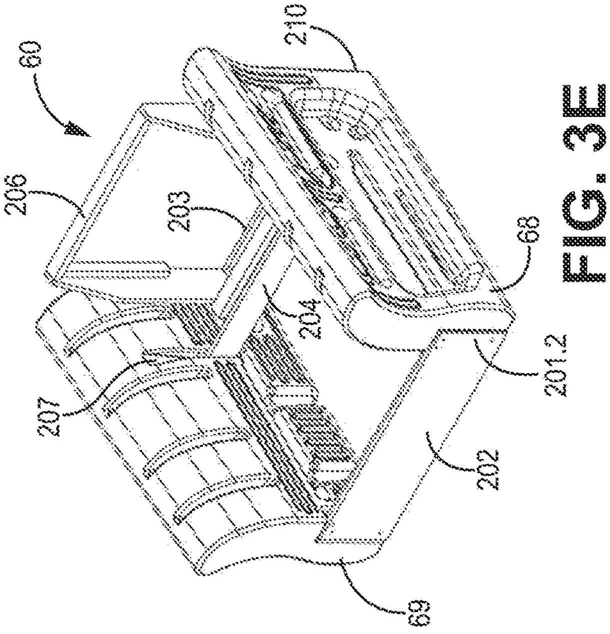
FIG. 3E is a front perspective view of a single seat frame according to embodiments.
Figure 3D:
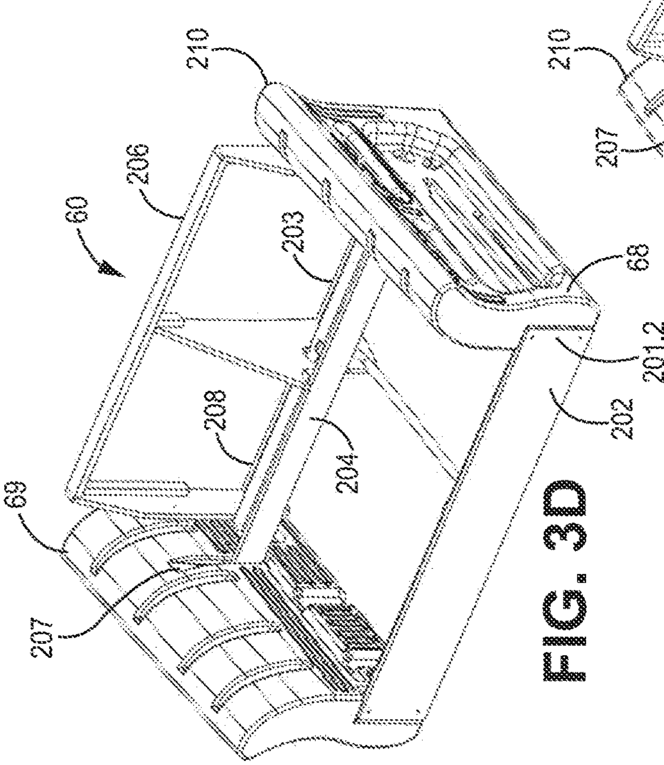
FIG. 3D is a front perspective view of a love seat frame according to embodiments.
Figure 3F:
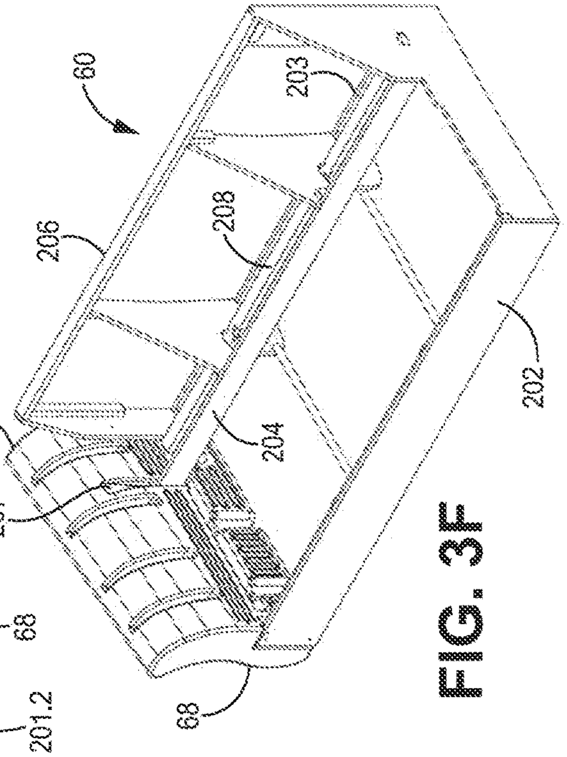
FIG. 3F is a front perspective view of a sofa frame with a single arm according to embodiments.

Referring to FIG. 3A, the arm rest portions 210 are separated by a distance D1 and the spanning wood frame members have lengths L1, L2, L3, L4, L5, L6 that are all greater than the arm rest separation distance D1. The spanning wood frame members may be unitary wood boards, including OSB and plywood.

The frames 60 may include one or more seat stretchers 212 (which can be made of metal). The back of frame 60 can further include one or more upright back rest frame members 214 (which can be made of plywood or oriented strand board or "OSB") further forming a back portion of frame 60. Frame 60 can include one or more tie blocks 216 (which can be made of hardwood or "HW") for connecting the components of frame 60 together and maintaining the positioning and angles of frame 60.

Figure 7A:
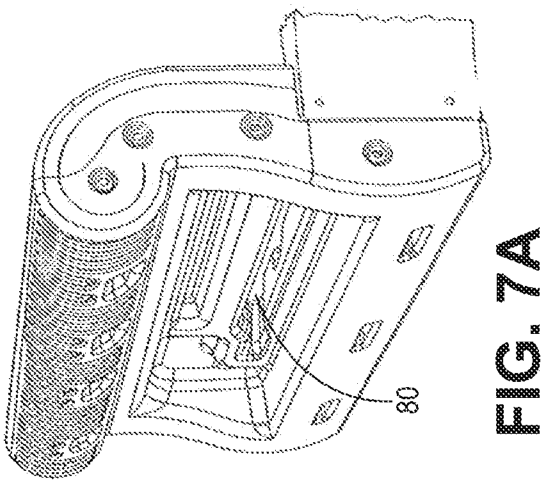
FIG. 7A is a front perspective view of the slotted blowmolded arm rest form of FIG. 6A.
Figure 7B:
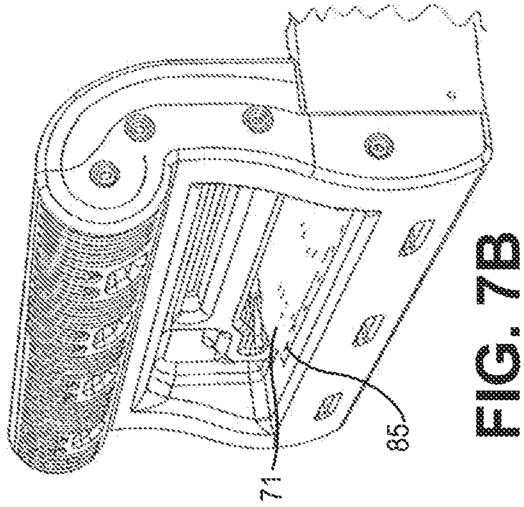
FIG. 7B is the front perspective view of the arm rest form of FIG. 7A with seat deck and/or upholstery material extending through the slot.
Figure 7C:
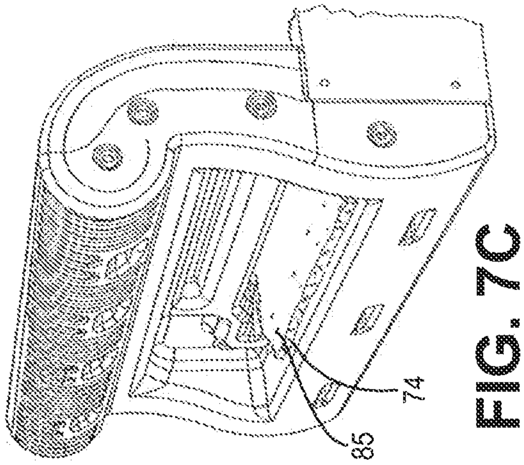
FIG. 7C is the front perspective view of the arm rest form of FIG. 7B with the seat deck and/or upholstery material stapled to the wall of the arm rest form.

Referring to the seat frames FIGS. 3A to 4C, molded components, arm rest forms 210, can be connected to other components of sofa frame 60 depicted in FIGS. 3A to 4C with various fasteners, such as brackets, screws, clips, dowels, staples and other fasteners. Referring to FIG. 5A, a metal insert 217 having a threaded bore 217.4 may be fastened in the hole 217.6 and onto wall portion 217.8 of the blow molded arm rest form or other blow molded component. Installation of the fastener clamps the fastener to the form wall. See U.S. Pat. Nos. 9,309,914; 7,713,011; US2013/0316123; U.S. Pat. Nos. 9,651,080 and 9,028,185, each of which are incorporated by reference herein. The metal threaded insert 217 may receive a screw 217.9, such as, by way of example only, a ¼-20 bolt, to connect molded components to other components. Such connection can be between blow-molded components and other components made of materials such as, by way of example, hardwood, softwood, engineered woods, such as plywood, hardboard, millboard, chipboard, and fiberboard, metal, and plastics. Specifically the insert can securely attach the spanning wood frame members 201. The insert 217 extends from the exterior surface 211.2 to the interior surface 211.4 of the continuous wall 211 of the arm rest form 210. The end 201.2 of the spanning wood frame member seats in the seating position 207.5 with the exterior surface 211.4 of the spanning frame member 201 confronting and then engaging the exterior surface 211.2 at the recess 207.5. Particularly with respect to the lower forward rail and the back lower rail, the end of said spanning frame members interface with a planar or substantially planar surfaces on the blow molded arm rest forms. The forward facing planar or substantially planar first forward engagement area 229.1 of the arm rest forms that directly engages the planar back facing surface of the lower front rail may have an engagement area of at least 12 square inches. In embodiments the engagement area is at least 8 square inches. In embodiments the engagement area is at least 16 square inches. In embodiments, the engagement area is at least 20 square inches. The rearward facing planar or substantially planar first rearward engagement area 229.3 of the arm rest forms that directly engages the planar forward facing surface of the lower back rail may have an engagement area of at least 12 square inches. See FIG. 7. In embodiments the engagement area is at least 8 square inches. In embodiments the engagement area is at least 16 square inches. In embodiments, the engagement area is at least 20 square inches. Such an engagement surface that is parallel to an upright plane traversing both arm rest forms provides an enhanced rigidity to the rectangular form defined by the forward and back lower rails and the two polymer arm rest forms. Moreover at the forward lower rail a further second planar engagement area 229.5 is positioned at a right angle to the first forward engagement area 229.1 that may have an area greater than 3 square inches in embodiments. In embodiments said area is greater than 5 square inches. Moreover at the back lower rail a further second planar engagement area 229.7 positioned at a right angle to the first rearward engagement area 229.3 that may have an area greater than 3 square inches in embodiments. In embodiments said area is greater than 5 square inches. Such areas arranged at a right angle provide further structural rigidity to the rectangular shape as viewed from above of the forward and back lower rails and the molded arm rest portions, particularly where the lower rails are attached with threaded fasteners to the arm rest forms.

Figure 4A:
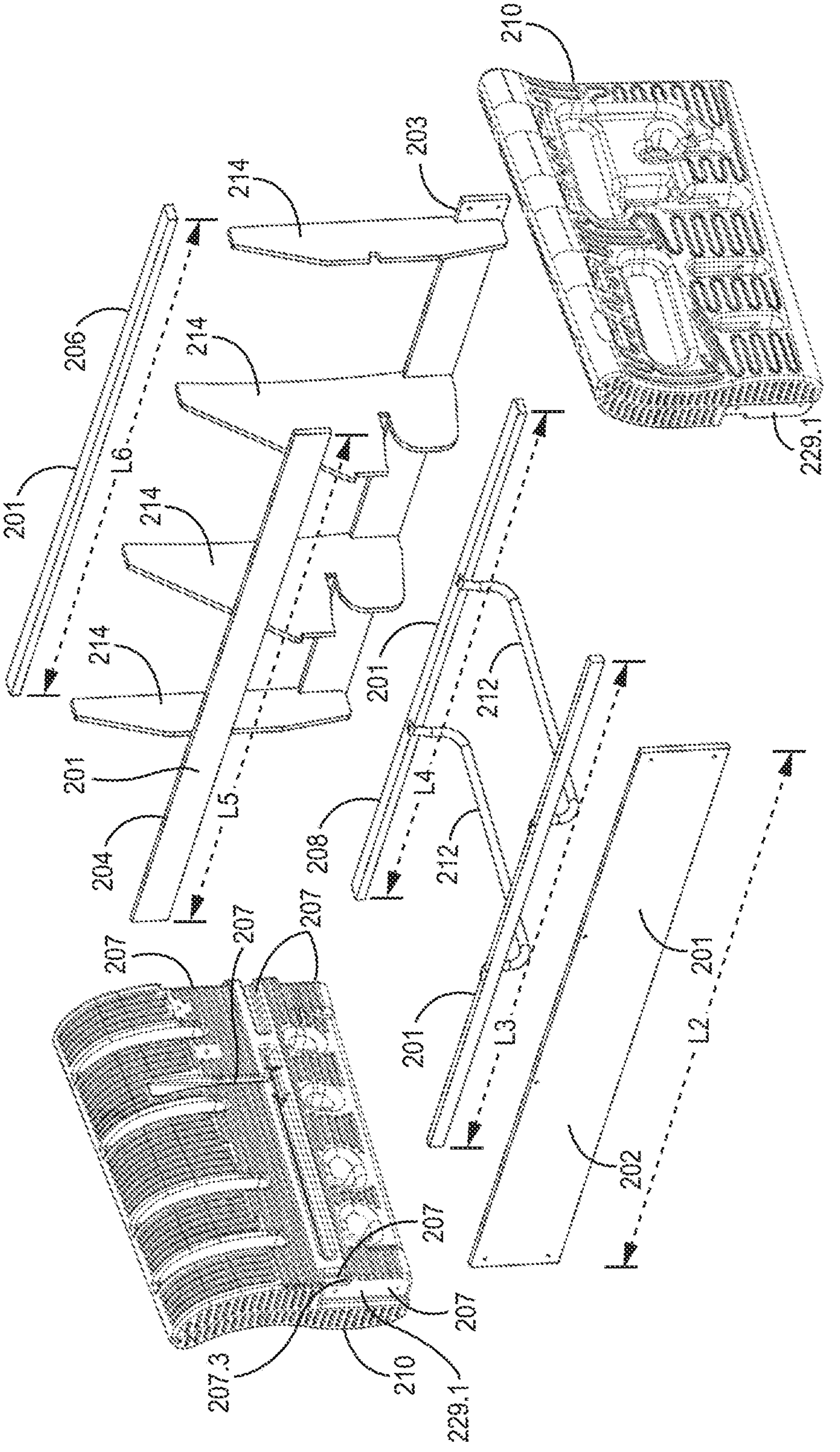
FIG. 4A is an exploded view of the sofa frame of FIG. 3A.
Figure 4B:
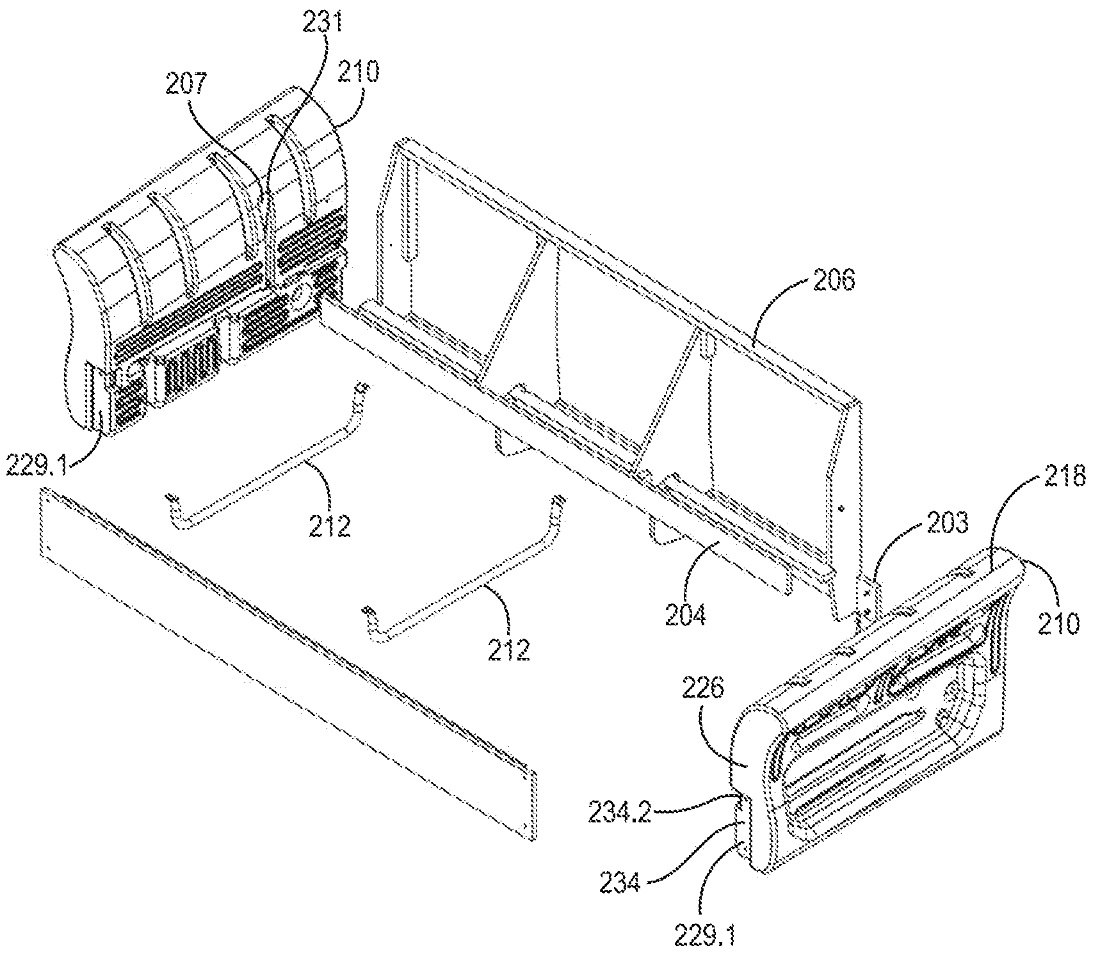
FIG. 4B is a front side exploded view of a sofa frame illustrating an integrated backrest frame as one of the components in accord with embodiments.
Figure 4C:
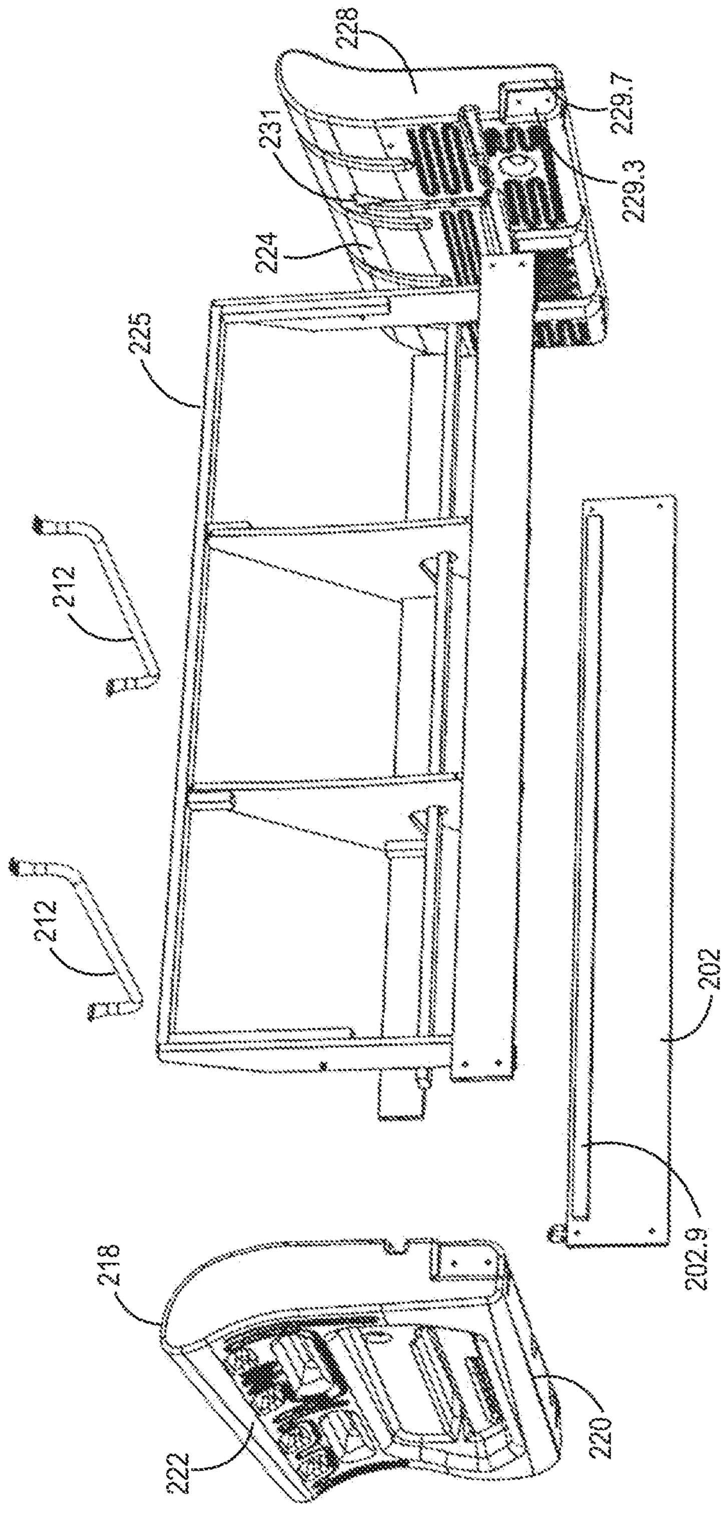
FIG. 4C is a back side exploded view of the sofa frame of FIG. 4B.
Figure 4D:
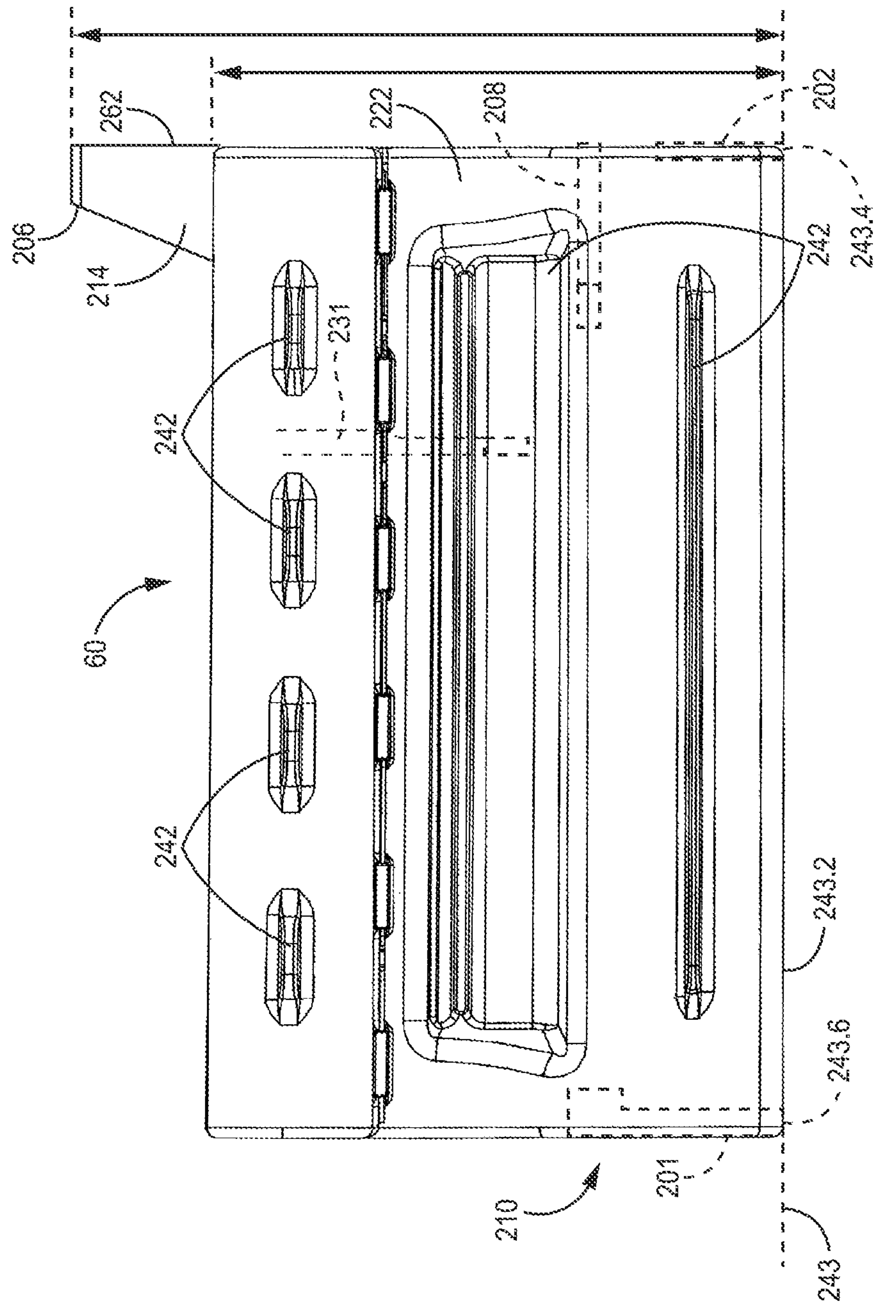
FIG. 4D is a side elevational view of an arm rest form.
Figure 5B:
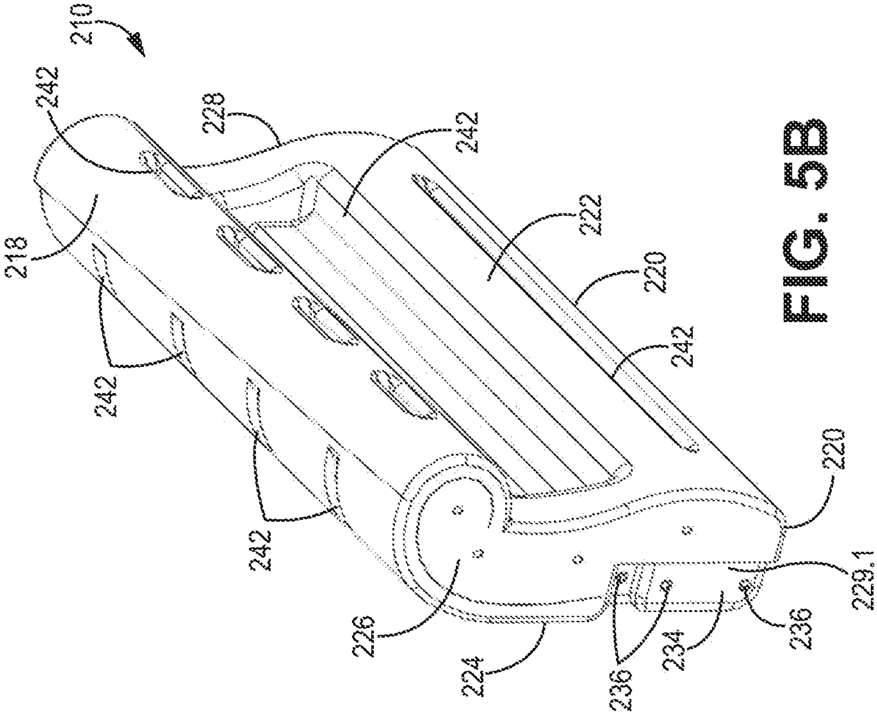
FIG. 5B is a perspective view of a blowmolded arm rest form with embedded threaded fasteners secured to a front wall and apertures for receiving connectors for an upholstered panel.
Figure 5A:
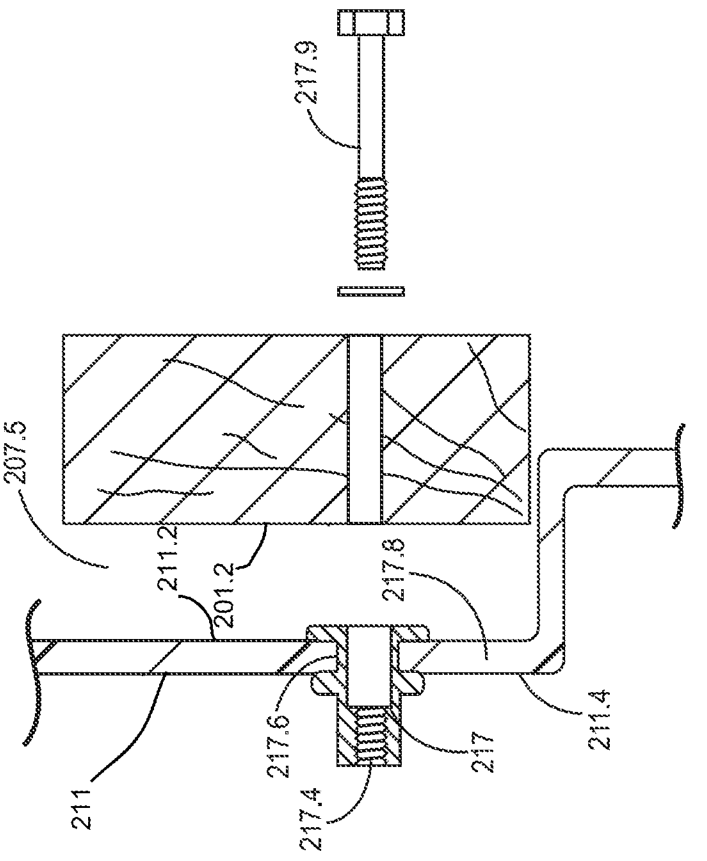
FIG. 5A is a cross-sectional view of a wall portion of a molded arm rest form showing a recess for receiving a spanning wood frame member and a threaded fastener clamping the wall.
Figure 5F:
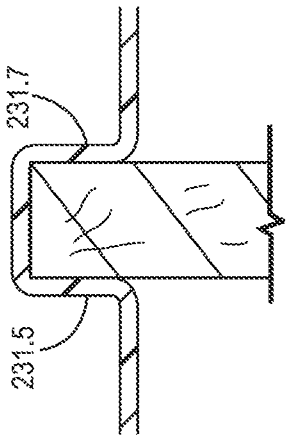
FIG. 5F is an elevation sectional view of the breast rail and slot of FIG. 5E with the end of the breast rail seated in the slot.
Figure 5D:
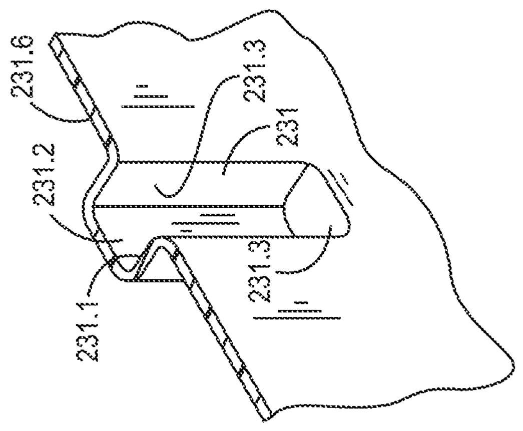
FIG. 5D is a perspective sectional of the upright slot for a breast rail.

Referring to FIGS. 4B, 4C, 5C-5F, an upright slot 231 for receiving, for example, a breast rail 204 is defined by a inset in the wall portion 231.6 at and about the slot. The slot has four slot defining wall surfaces 231.1, 231.2, 231.3, 231.4. As illustrated in FIG. 5D, the width W1 of the slot as defined by the spacing between opposing side wall portions 231.5, 231.7 of the slot is less than the thickness or width W2 of the spanning frame member, in this case the breast rail 204. When seated as in FIG. 5E, the resilient side wall portions deflect away from the end of the frame member and providing a clamping action on the end of the frame member 204. This clamping action and the coefficient of friction between particular polymers such as polyethylenes and wood effectively retains the frame member in the slot. The width of the spanning wood frame members may suitably be between 0.5 inches and 2 inches in embodiments with the width of the slot or recess reflective of same. The width of the spanning wood frame members may suitably be between 0.4 inches and 3 inches in embodiments with the width of the slot or recess reflective of same.

Arm rest forms 210 can be formed of by molding methods, such as blow molding (injection blow molding, extrusion blow molding, injection stretch blow molding), including more than one parison, and formed of different materials including, by way of example, polyethylene (PE), such as high-density polyethylene (HDPE) and low-density polyethylene (LDPE), polyvinyl chloride (PVC), polypropylene (PP), nylon, and polyethylene terephthalate (PET), thermoplastic elastomers (TPE), acrylonitrile butadiene styrene (ABS), polyphenylene oxide (PPO), nylon/polyamids (PA), polycarbonate (PC), polyester and copolyester, urethane and polyurethane, and acrylic and polystyrene. In other embodiments, molded components can be formed by differing molding methods, such as injection molding (overmolding, insert molding, cold runner injection molding, hot runner molds, rotational molding).

Figure 5E:
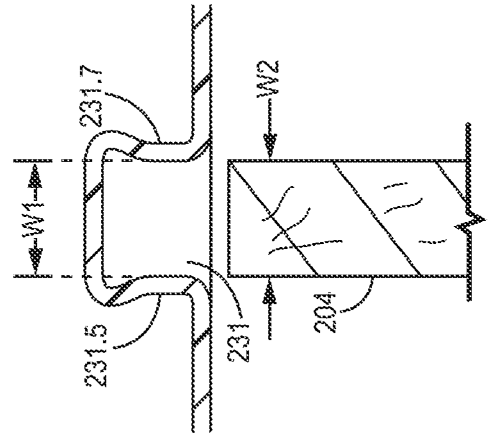
FIG. 5E is an elevation sectional view of the slot of FIGS. 5C and 5D with an end of a breast rail to be received. The section is taken at line 5E-5E of FIG. 5C.
Figure 5C:
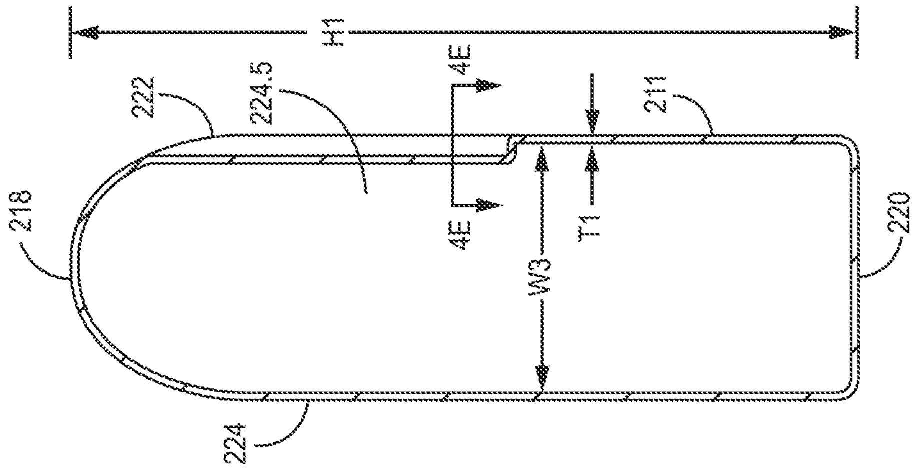
FIG. 5C is a cross-sectional view taken vertically through a blow molded arm rest form through an upright slot for receiving a spanning frame member, for example, a breast rail.
Figure 6A:
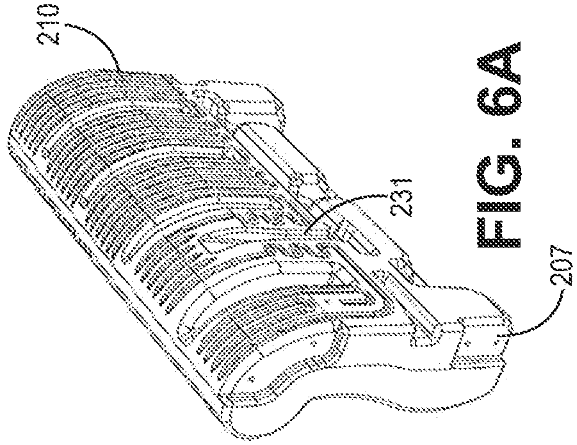
FIG. 6A is perspective view of the back side of blowmolded arm rest form with a slot.
Figure 6B:
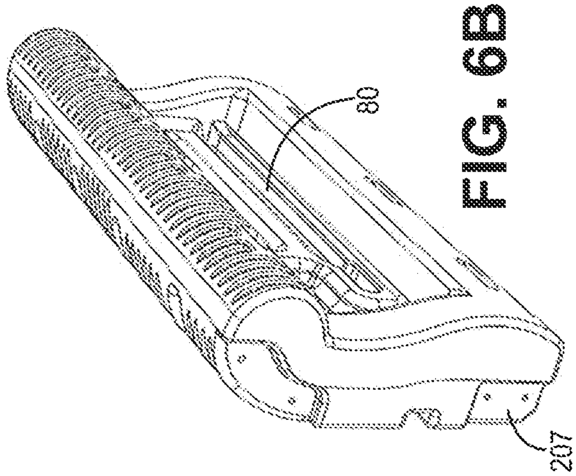
FIG. 6B is the mirror image blowmolded arm rest form of the arm rest form of FIG. 6A.

As best depicted in FIG. 5C, the thin wall 211 extends continuously without interruption about the top 218, bottom 220 and two sides 222, 224. The relatively thin wall compared to the height and volumetric size of the arm rest form allows resiliently deformability/deflectible upon impact, particularly for example if an individual unintentionally impacts the sofa with the arm rest form contained therein reducing the probability of an injury to such an individual. The average thickness T1 of the wall 0.04 to 0.25 inches. The height H1 of the hollow arm rest form may be for example, 16 inches to 30 inches. Thus in embodiments, the height of the arm rest form may be more than 60 times the average thickness arm rest form. In embodiments, the height of the arm rest form may be more than 100 times the average thickness arm rest form. In embodiments, the height of the arm rest form may be more than 200 times the average thickness arm rest form. In embodiments, the volume of the open interior 224.5 may be greater than 1 cubic foot. In embodiments, the volume of the open interior may be greater than 2 cubic feet. In embodiments, the volume of the open interior may be greater than 3 cubic feet. In embodiments, the maximum width W3 of the open interior is greater than 3.5 inches. In embodiments, the maximum width W3 of the open interior is greater than 4.5 inches. In embodiments, the maximum width W3 of the open interior is greater than 5.5 inches.

In embodiments, a plurality of spanning wood frame members extend between and are attached to a pair of spaced hollow polymer arm rest forms, each end of the spanning wood frame members received in a form fit recess, none of the recesses being a recess closed at the top, bottom, and two lateral sides of the recess whereby ends of the spanning wood frame members may be inserted from In embodiments, a ballast material can be added to arm rest forms 210 to provide further stability and acoustical insulation to arms 210 and frame 60, generally. Such ballast material can include foam, such as a density foam, sand, cement, or other material. In embodiments, ballast can be added to arms 210 via a port or other opening in arm rest form (not depicted) that can include a cap or other closure structure that can be permanently or selectively closed.

In embodiments, frame 60 depicted in FIGS. 3A to 4A can have up to and over 10 less parts, 20 less parts, or even greater than frame 100 depicted in FIGS. 1 and 2. Also, not only is the number of components that need to be assembled is minimized, but the frame is simpler to assemble and the time for assembly is minimized, in part due to there being less secondary operations. In embodiments, the sofa frame 60 has 20 or less frame member components not counting fasteners. In embodiments, the sofa frame has 18 or less frame member components not counting fasteners. In embodiments, the sofa frame has 16 or less frame member components not counting fasteners. Also, with respect to shipping, the lighter weight reduces freight costs. Yet, frame 60 is robust, sturdy, and comfortable.

Referring to FIGS. 4B and 4C, the backrest frame 225 can be an integrated preassembled backrest frame that is brought to the assembly line in one piece. Such assembly can be done at an assembly station nearby manually or by automated/robotic means. Where the backrest frame is brought to the frame assembly location, essentially six components are assembled to complete the seat frame. Specifically, two blowmolded arm rest forms 210, the preassembled backrest frame 225, a front lower rail 202 (with spring rail 202.9 previously attached), and two seat stretchers 212. In embodiments, assembly of the frame can be completed with a minimum number of fasteners, for example, eight. Specifically, four in the front lower rail, four in the back lower rail, and four for the two seat stretchers. This advantageously reduces time, and labor. FIGS. 24-28 illustrates the steps and the minimal number of fasteners 227.7.

Figure 10:
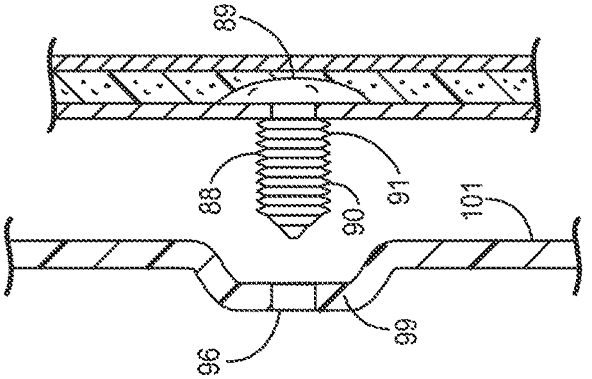
FIG. 10 is a cross-sectional view of the upholstered panel with a Christmas tree connector confronting the front wall of the arm rest form prior to connection.

Arm rest forms can be formed in any of a number of desired furniture arm shapes including, by way of example, track, ruched, modern scroll, pad, track with nails, key, modern English, shelter, pleated, and saddle. Arm rest forms can include a top 218, a bottom 220, an outer lateral side 222, an inner lateral side 224, a front 226, and a back 228. Referring to FIG. 10, inside wall portion 224 can include one or more recesses 207 or slots configured for one or more rails, such as, by way of example, spring rail slot 230 for receiving rear spring rail 208 and breast rail slot 231 for receiving breast rail 204. Inside wall portion 224 can further include one or more structural recesses 232 that can provide further structure, robustness, and sturdiness to sofa. Inside 224 can further include one or more apertures or openings 233 for use with metal insert threaded connectors for connecting arms to other components of furniture structure.

Referring to FIGS. 4A-5B, front wall portion 226 can include one or more recesses 207 configured for one or more rails, such as a lower front rail recess 234 and front spring rail recess 234.2. Front wall portion 226 can further include one or more apertures or openings 236 for use with threaded metal inserts 217 for connecting arms to other components of furniture structure. Rear wall portion 228 can include one or more recesses configured for one or more rails or uprights, such as a lower back rail recess 238, an upright recess 240, and a rear spring rail recess 230. Rear wall portion 228 can further include one or more apertures or openings 242 with connectors for connecting arm rest forms to other components of furniture structure. Outside wall portion 222 can further include one or more structural recesses 242 to provide further structure, robustness, and sturdiness to a sofa frame. Referring to FIG. 4D, an end view of the sofa frame 60 provides relative locations of the spanning frame members and recesses in which they are received. The sofa frame 60 has a bottom margin or datum level 243. The lower margin 243.2 of the arm rest form is at said datum level as is the lower margin 243.4 of the lower back rail 203 and the lower margin 243.6 of the lower front rail 202.

In embodiments, fill material can be added to the hollow interior of the blow molded arm rest to provide enhanced weight carrying capability. The fill material a foam that becomes rigidized within the hollow interior, such as a sprayed in polymer foams, for example expanded polystyrene. In embodiments, an expanded polystyrene form may be coated with a more rigid polymer such as a polyethylene. In embodiments, the hollow blow molded arm rest form or other form may be hermetically sealed such that air is trapped within the form, the compressible air providing resistance to the form collapsing or deforming inward. In embodiments, air pressure or gas pressure can be above atmospheric in the blow molded arm rest form.

Blow molded arm rest forms 68, 69 are further depicted in FIGS. 6A-7C and include a horizontal through-slot 80. The lateral extensions 71 of the textile deck extend though the slot and are fastened, such as by staples 85 to the wall of the arm rest form. Also, the cushion layer 74 may extend through the through-slot and similarly be attached to the arm rest form.

Figure 11:
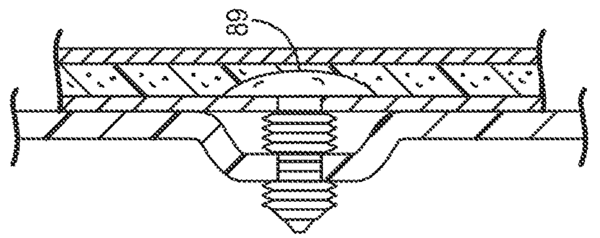
FIG. 11 is a cross-sectional view of the upholstered panel connected to the arm rest form of FIG. 8.

Referring to FIG. 8-11, upholstered arm rest panels 49 may be configured with integrated Christmas tree fasteners 88 formed of polymer having a head 89 and a forward prong 90 with catch rings 91. The head is position within the panel 49. The arm rest form front wall 94 has a plurality of recessed apertures 96 for receiving the Christmas Tree connectors. The aperture 96 is in a recessed wall portion 99 offset inwardly from the front surface 101 of the front wall 94. FIG. 11 illustrates the panel engaged with the arm rest form. The panel is forcefully pushed toward the arm rest form, such as a direct blow to the panel where the Christmas tree connectors are located. This can seat the prong of the connector fully such that the prong is under tension and the recess wall portion is flexed toward the panel providing a secure tight fit of the panel to the arm rest form. In embodiments, upholstery material my cover the front face with the material then sandwiched between the panel and the arm rest form. In embodiments such Christmas tree connectors may be utilized to attach other components to the arm rest forms. See U.S. Pat. No. 8,764,115 owned by the owner of this application, said patent is incorporated herein by reference for all purposes.

Figure 15A:
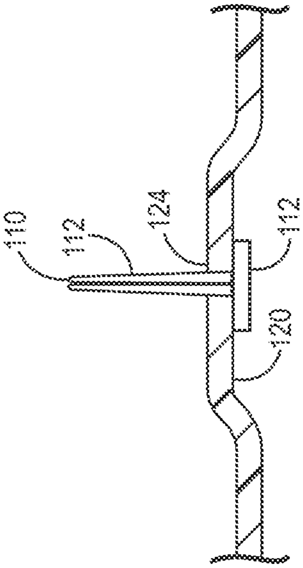
FIG. 15A is a cross sectional view taken at line 15A-15A of FIG. 13 showing the expanding winged connector in place in the recessed bottom wall of the arm rest form.
Figure 15B:
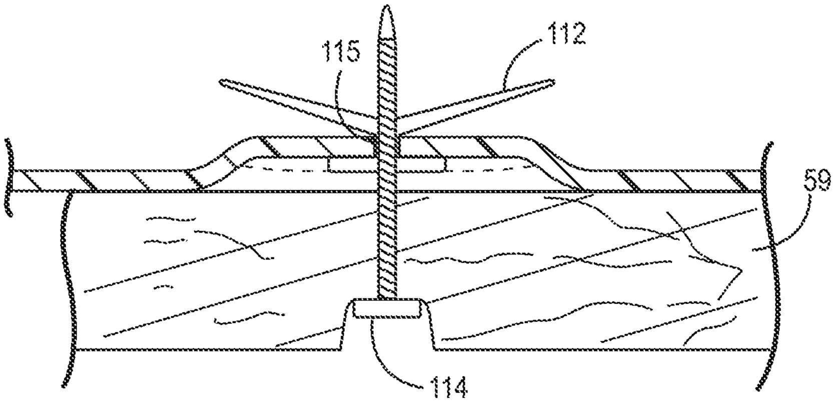
FIG. 15B is the foot of FIG. 12 attached to the arm rest form.
Figure 15C:
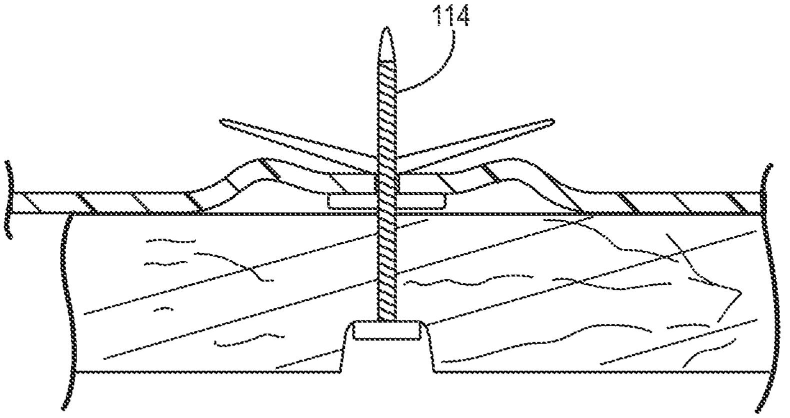
FIG. 15C is the foot of FIG. 12 tightened further.

Referring to FIGS. 12 to 15C, attachment of the foot 59 to the arm rest form 69 is illustrated. Said attachment means could be utilized for connecting other components to the arm rest forms as well. A expanding winged connector 110 has a head 112, a pair of expandable wings 112, a screw 114, and a screw receptacle portion 115. Molded in recessed portions 120 may have apertures 124 for receiving the winged connector 110. The foot 59, or other component, may be attached with the screw extending through the component and into the screw receptacle portion 115 of the connector. Insertion of the screw, by rotation, forces the wings to expand thereby securing the connecter in the arm rest form. Further tightening, as shown in FIG. 15C can pull the recessed portion to the component, effectively locking the component to the arm rest portion with the wall portion flexed and the screw under tension.

Figure 16:
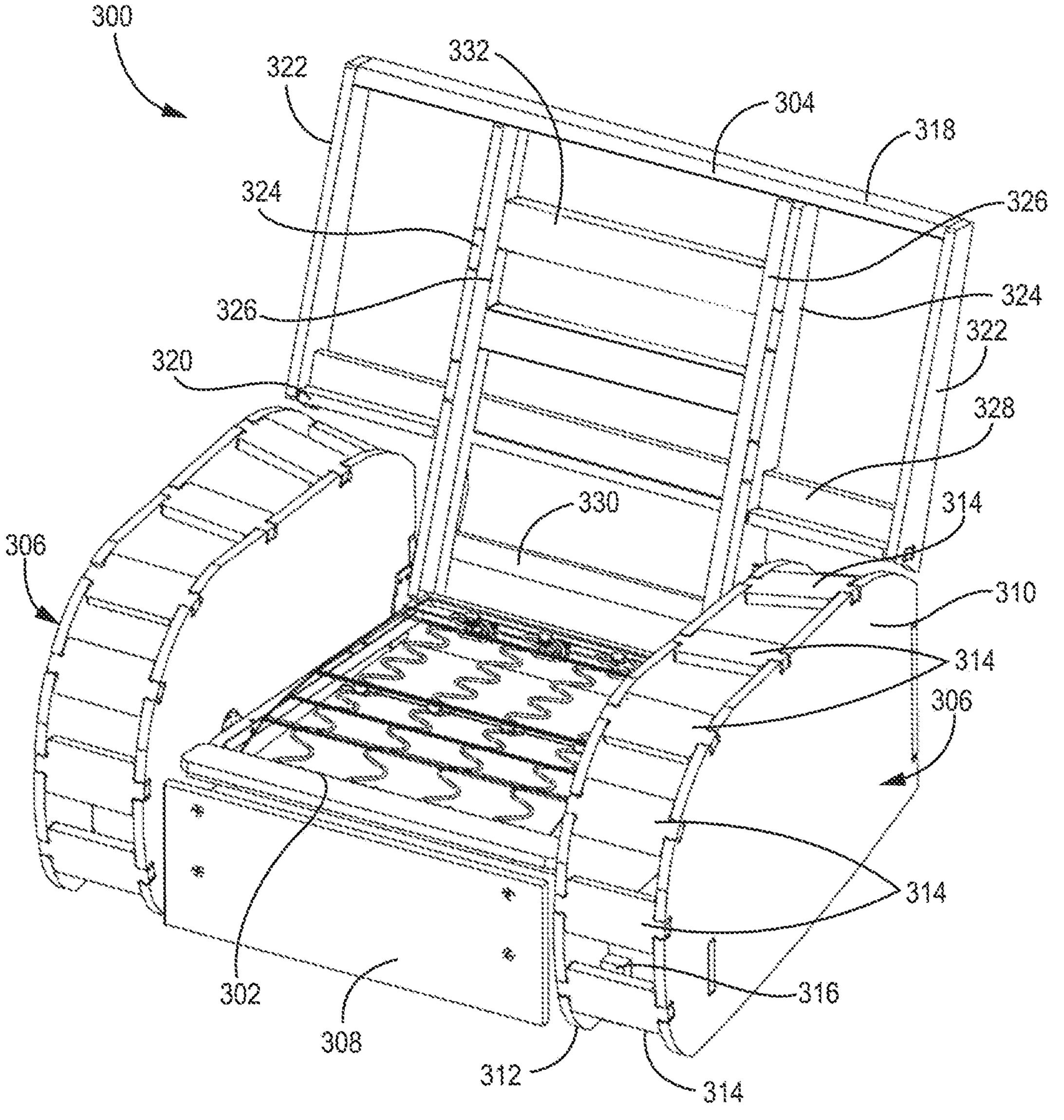
FIG. 16 PRIOR ART
FIG. 16 is a perspective view of a PRIOR ART recliner frame not including any molded plastic components.

Referring to FIG. 16, a prior art structural frame 300 for a recliner is depicted. Certain portions of frame 300 once assembled, such as arms portions, can be covered by cardboard or fiberboard for providing further shape and, further, can be covered by padding or cushioning, such as load poly, arm fiber, and/or foam, and can then covered with fabric, leather, synthetic fabric, faux leather, microfiber, or other upholstery or covering materials. As depicted, prior art chair frame 300 generally includes a seat box 302, a back rest form 304, two arms 306 and a footrest 308.

Each of prior art arm rest frames 306 can include a number of components, including outside arm rail 310, inside arm rail 312, and a plurality of arm fillers 314 connecting outside arm rail and inside arm rail. A plurality of tie blocks 316 can be included for connecting the components of the arm—only one being depicted in FIG. 16. Arm rest frame 306 can further include cardboard or fiberboard for providing further shape or support to arm (not depicted in FIG. 16). As depicted, each of arm rest frames can includes about 19 parts, not including fasteners. Typically a multitude of fasteners, such as staples, and wood glue are utilized for assembling the arm rest frames.

Prior art back rest 304 can include a number of components, including a top back rail 318, a bottom back rail or wing mount 320, one or more wings 322, one or more back posts 324, one or more back post stiffeners 326, a back brace 328, a breast rail 330, and webbing 332. As depicted, backrest includes about 15 parts. A multitude of fasteners, such as staples are utilized for assembling the back rest.

Referring to FIGS. 17-18B and 19A-19C, recliner frames 400, 400.1 according to embodiments of the present disclosure, specifically a frame for a recliner, including four molded components (specifically, two arms 402, a backrest 404, and a footrest or ottoman 406) is depicted. In the FIG. 19A-19C embodiment, foot rest 406.1 may be a conventional wood panel. Frame 400 further includes a seat platform 407, reclining mechanism 408 for reclining function and a back rail 409. Reclining mechanism 408 has a pair of connecting arms 408.4 to connect to the back rest. As depicted in FIGS. 1C and 1D, recliner frame 400, once assembled, can be covered by padding or cushioning, such as load poly, arm fiber, and/or foam, and can then covered with fabric, leather, synthetic fabric, faux leather, microfiber, or other upholstery or covering materials. Fasteners such as staples may be used for attaching covering materials to molded components.

Molded components, here, arm rest forms 402, back rest form 404, and footrest 406 can be connected to other components of frame 400 with various fasteners, such as brackets, screws, clips, dowels, and other fasteners. Back rest form 404 can also be attached to recliner mechanism arms 408.4 via a coupler configured as a steel bracket 410, with a recess 411 such as depicted in FIG. 19. Such brackets are known as kd clips. Wall portions defining recesses can include the insert 217, shown in FIG. 4B, in which a bolt, such as, by way of example only, a ¼-20 bolt, can be threaded to connect molded components to other components, such as the seat deck and the recliner mechanism.

Figure 17:
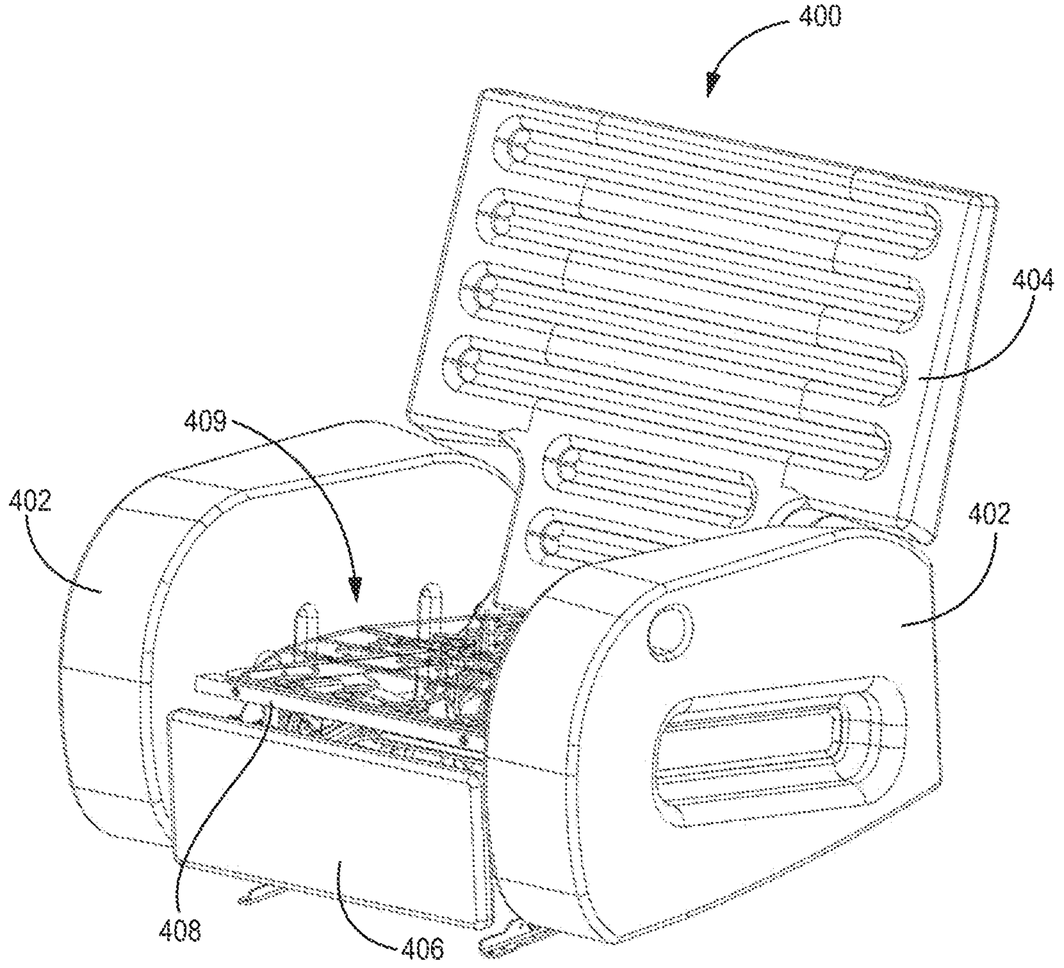
FIG. 17 is a perspective view of a recliner frame with a seat deck and recliner mechanism of a recliner such as shown in FIG. 1D according to embodiments including a molded backrest portion and two molded arm rest forms.
Figure 18A:
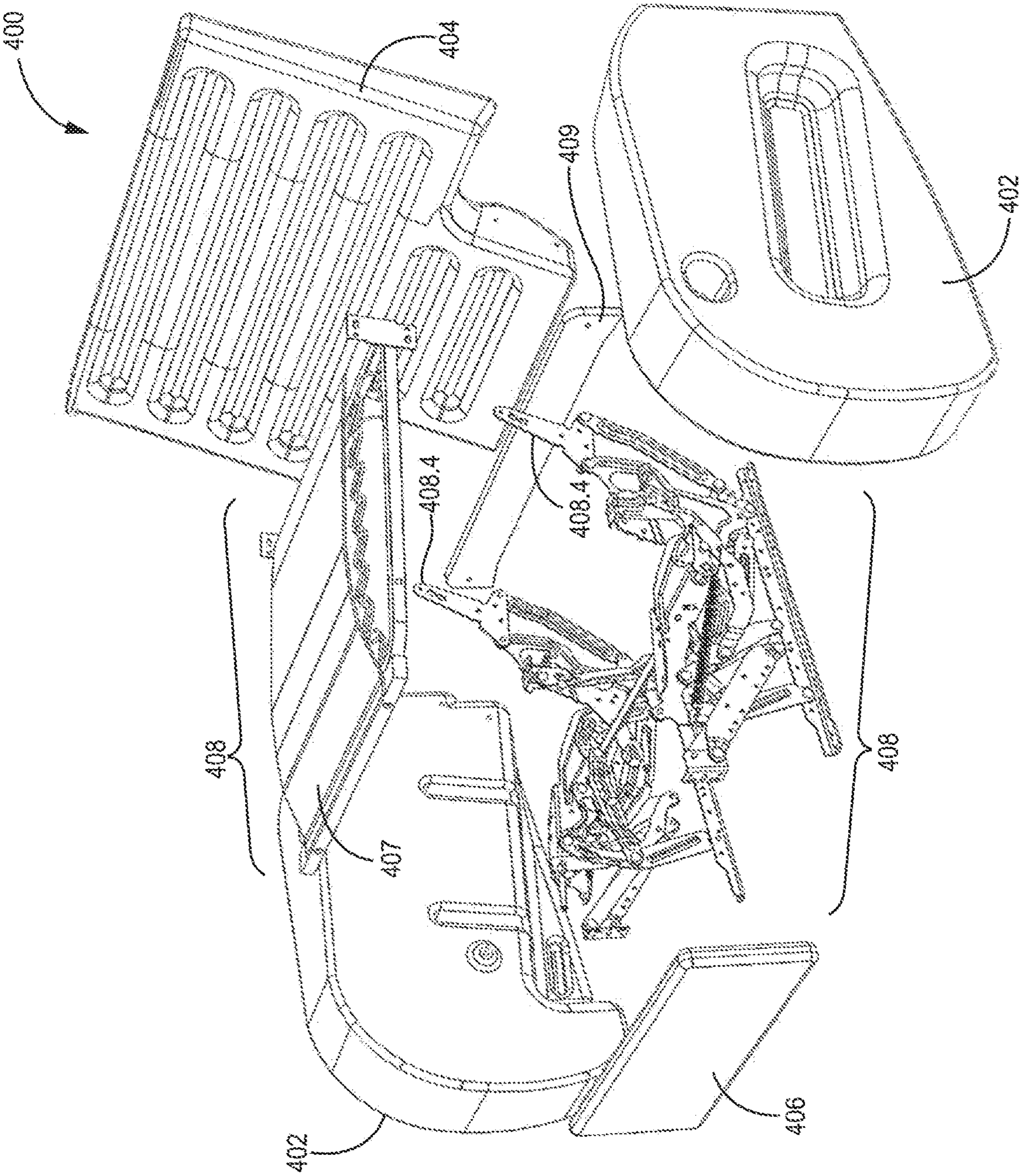
FIG. 18A is an exploded view of the recliner components of FIG. 17.
Figure 18B:
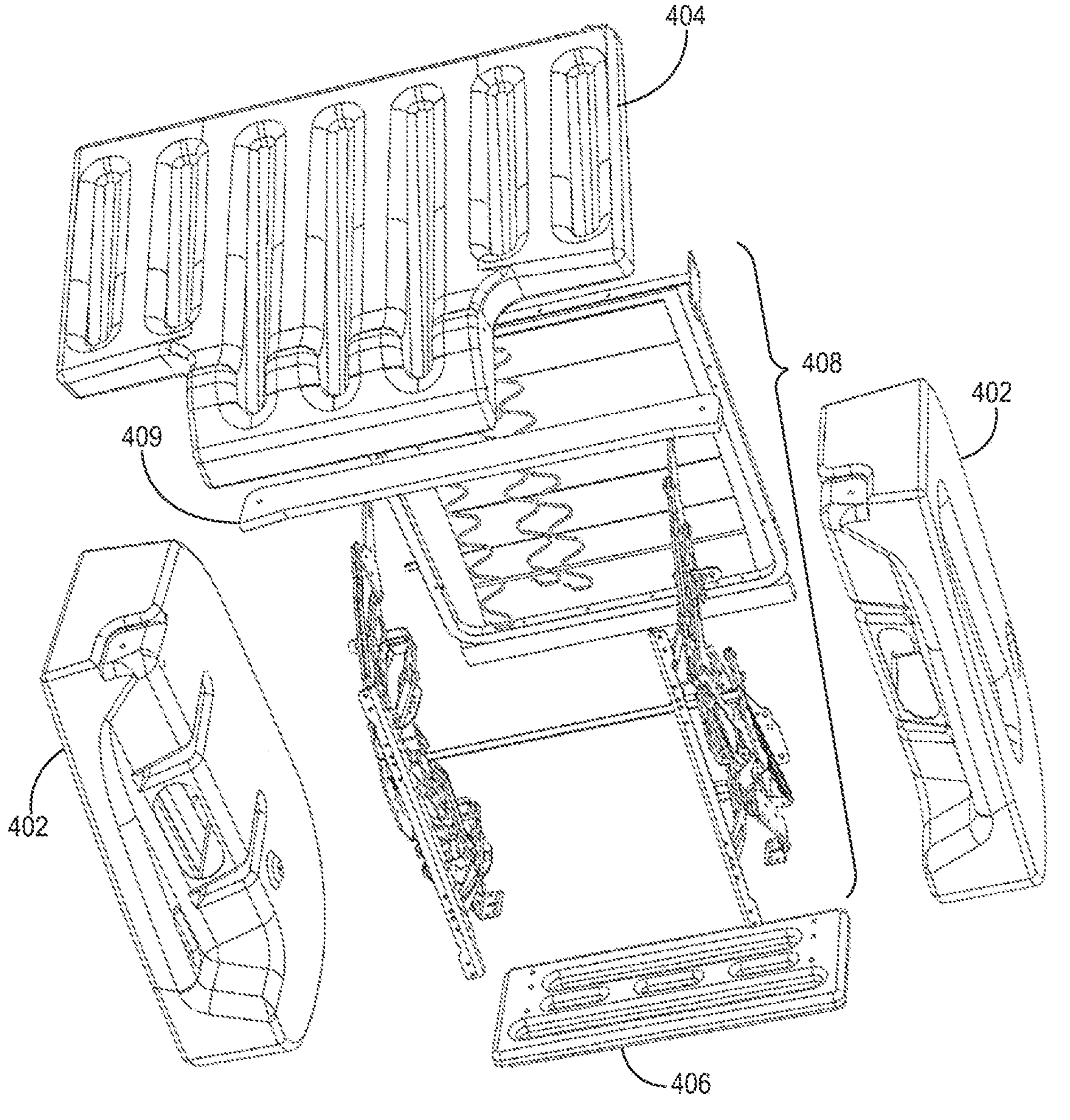
FIG. 18B is a rearward exploded view of the recliner of FIG. 17.
Figure 18D:
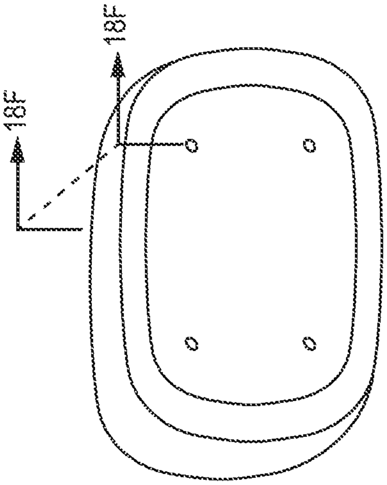
FIG. 18D is a perspective view of a reinforced blow molded arm rest form.
Figure 18C:
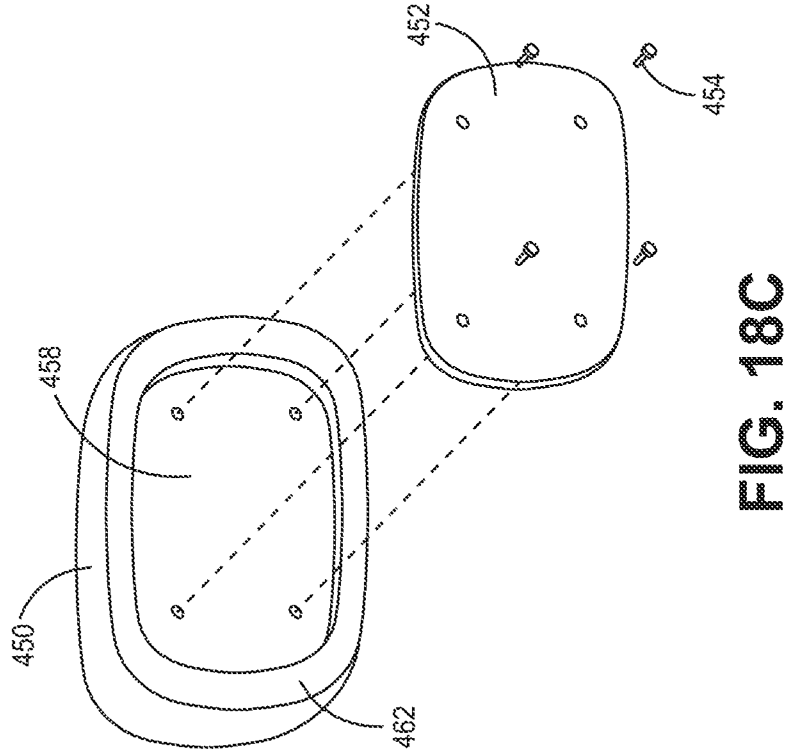
FIG. 18C is a perspective exploded view of a blow molded arm rest form with a reinforcing plate.
Figure 18G:
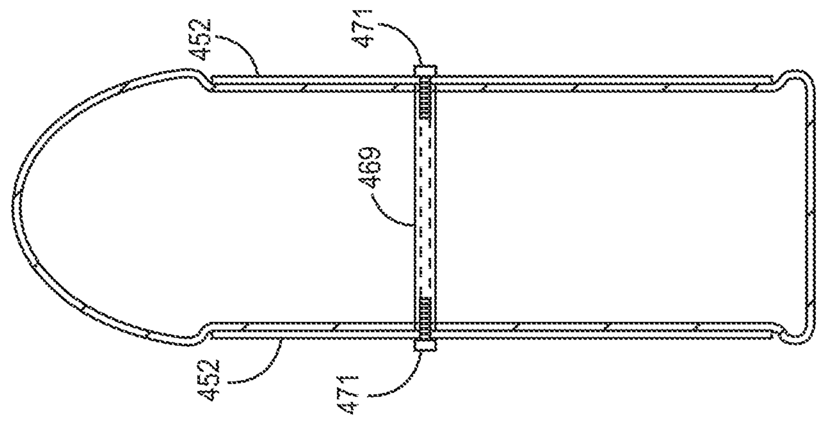
FIG. 18G is a cross-sectional view of another embodiment of a reinforced arm rest form.
Figure 18F:
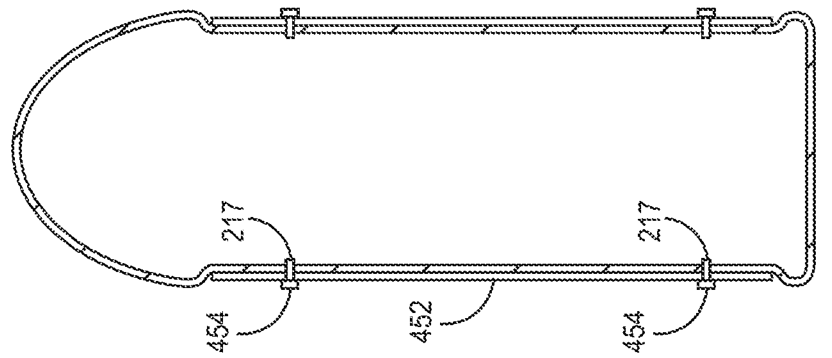
FIG. 18F is a cross sectional elevation view taken at plate 18F-18F of FIG. 18D.
Figure 18E:
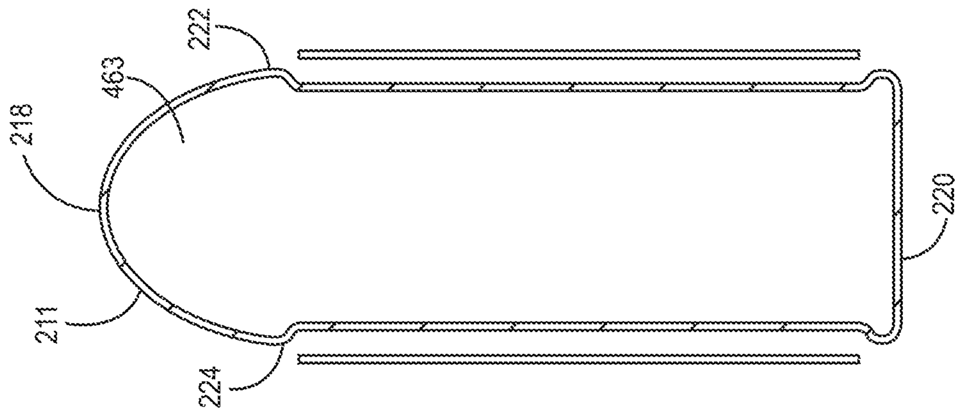
FIG. 18E is a cross sectional elevation exploded view of a reinforced arm rest form.

Referring to FIGS. 18C to 18G, blow molded arm rest forms 450 may be reinforced to provide enhanced weight carrying capacity or enhanced connectability to other componentry by utilizing plate 452 received in recesses 458 in sidewalls 462 of the arm rest form. As illustrated, the wall of the blow molded arm rest extends continuously around the top 218, two lateral sides 222, 224 walls, and bottom 220 without interruption closing the open interior 463 which defines a void volume. The reinforcing plates 452 may be secured with threaded fasteners 454 extending into the arm rest form wall 466, such as in a threaded insert 217 as illustrated in FIG. 4B. Referring to FIG. 18G, alternately, a spanning metal member, such as a piece of internally threaded tubing 469 that engages the plates and with screws 471 clamping the reinforcing plate to the ends of the tubing 469. Such reinforcing plates can be used in association with the recliner of FIG. 17 on the inside, outside or both sides of each blow molded arm rest form. Note in other embodiments, arm rest forms may be reinforced utilizing vertically extending elongate reinforcing plates or beams attached to the arm rest forms such as the upright back rest frame members 214 as is illustrated in FIGS. 3A-5B. In embodiments such beams and/or elongate plates may be received in elongate slots or recesses extending primarily vertically on the arm rest forms. Such beams and/or elongate plates may be secured with threaded fasteners or may be retained by way of an interference fit with the beam or plate, similar to what is shown in FIGS. 5E and 5F. Further structural enhancement may be provided by providing a hermetically sealed arm rest form, and further providing a positive pressure in the interior.

Figure 19B:
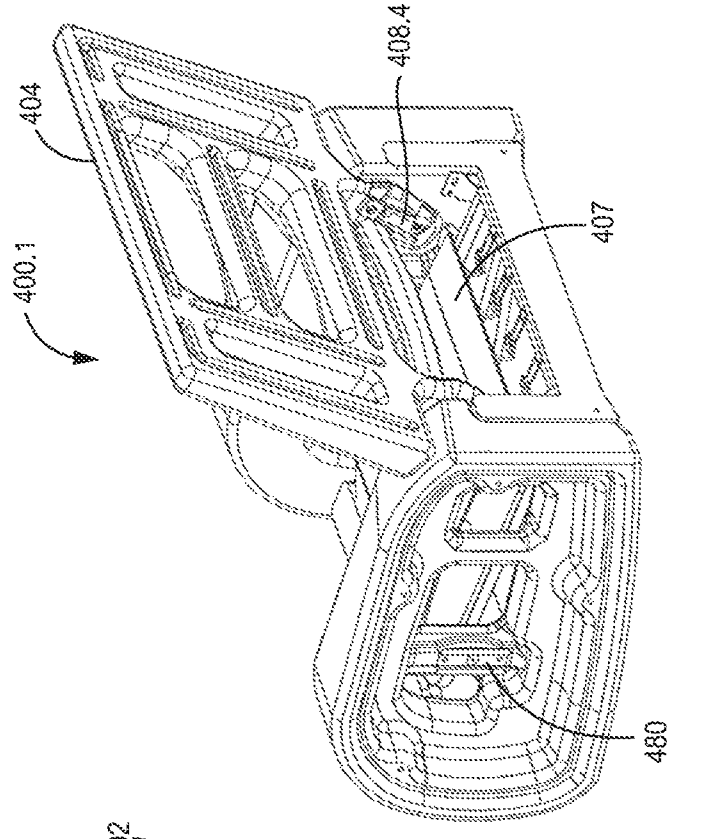
FIG. 19B is a back perspective view of the recliner frame of FIG. 19A.
Figure 19A:
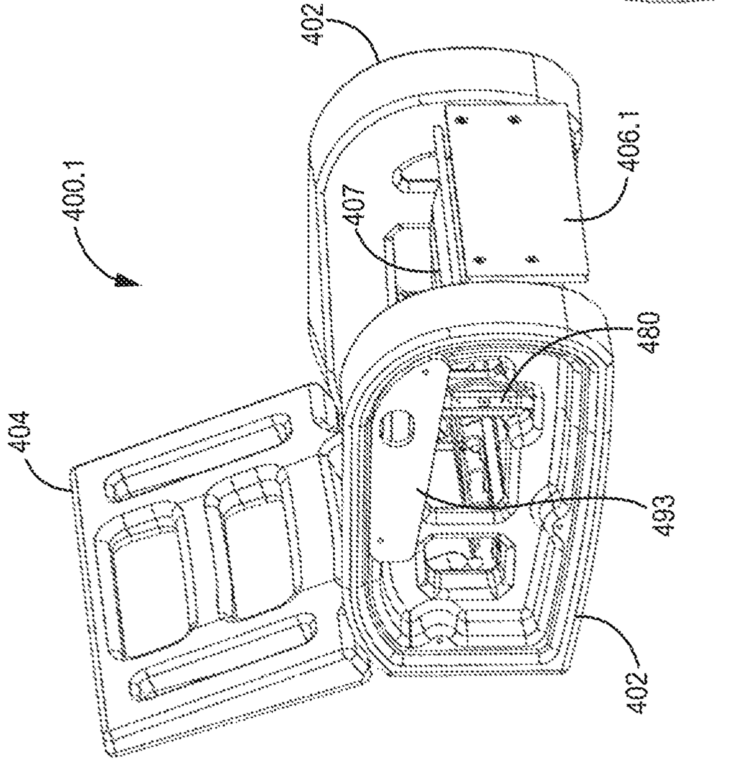
FIG. 19A is a front perspective view of a recliner frame in accord with embodiments.
Figure 19C:
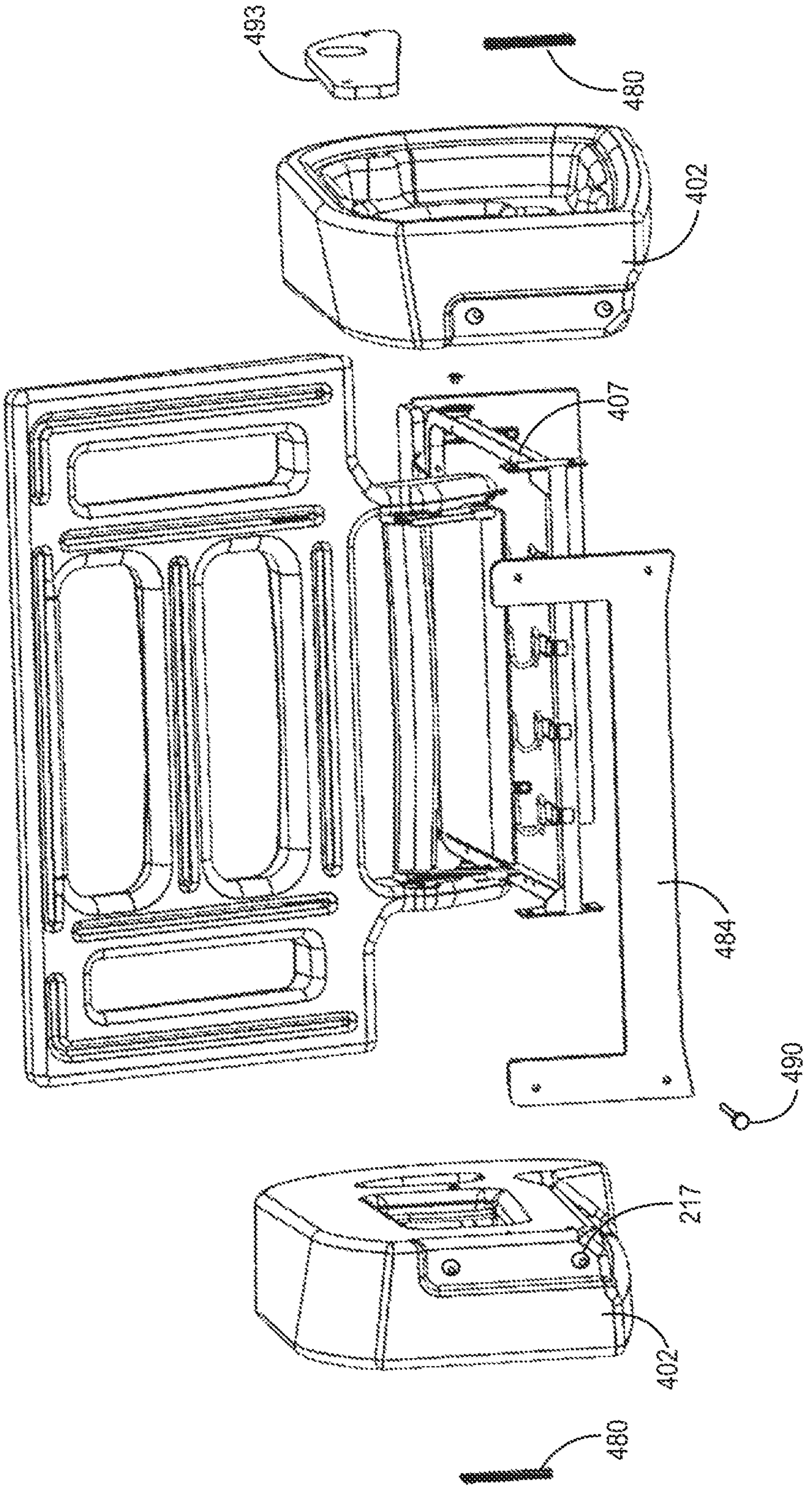
FIG. 19C is an exploded view of the recliner frame of FIGS. 19A and 19B.
Figure 20:
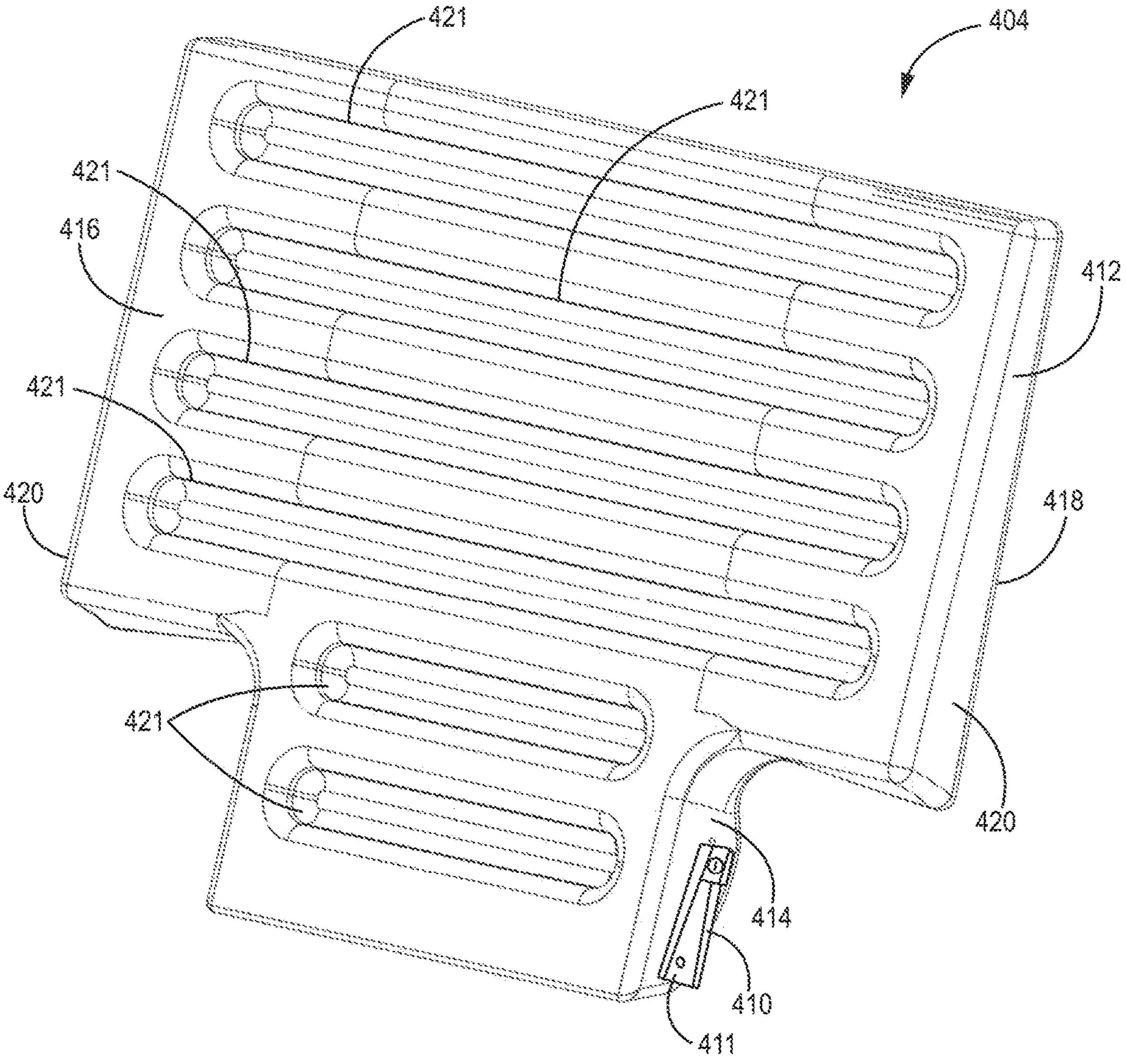
FIG. 20 is a front perspective view of a blowmolded recliner back rest with couplings for connection to a recliner mechanism.
Figure 21B:
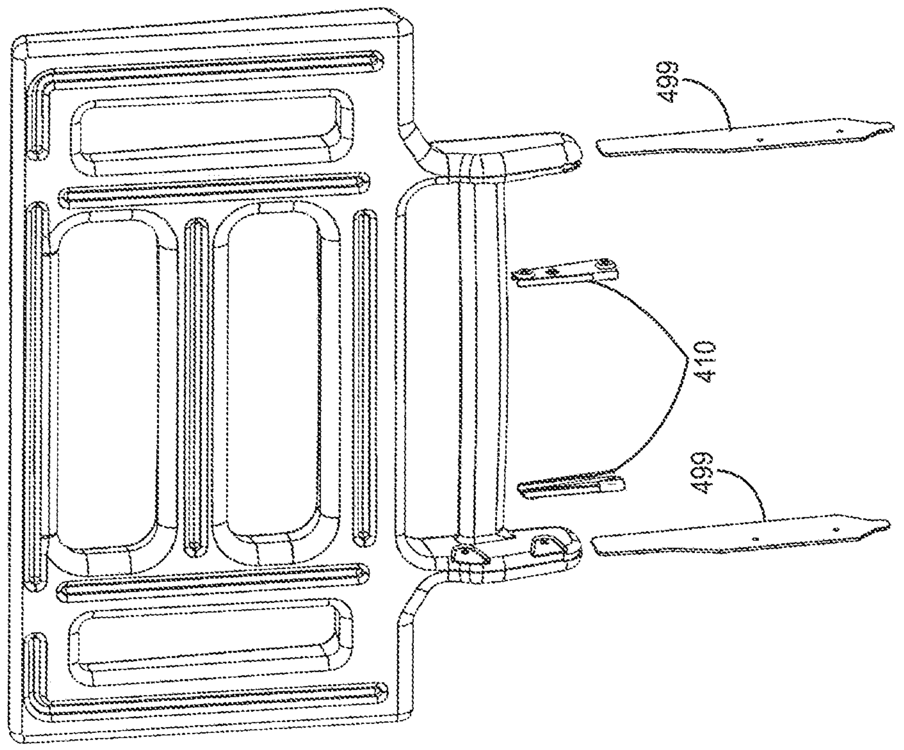
FIG. 21B is an exploded view of the backrest of FIG. 21A.
Figure 21A:
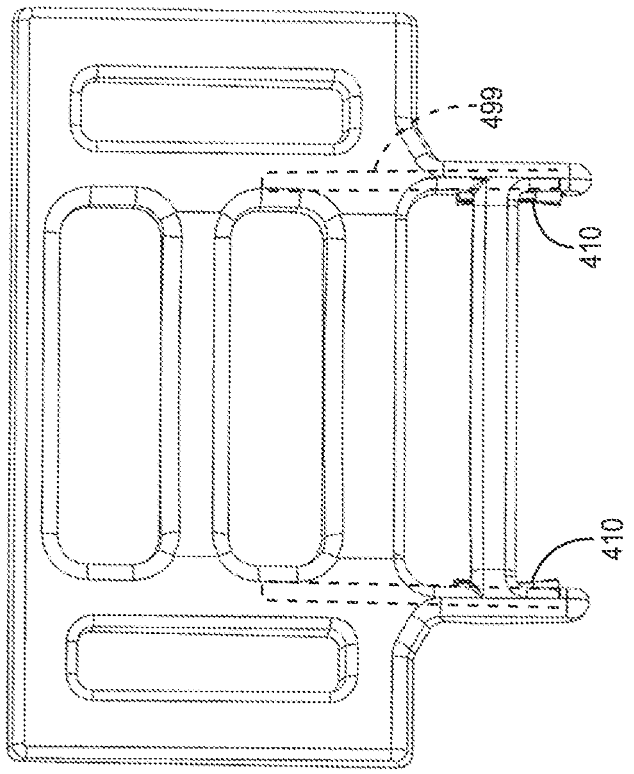
FIG. 21A is a front perspective view of the backrest of the recliners of FIGS. 19A-19C.
Figure 23B:
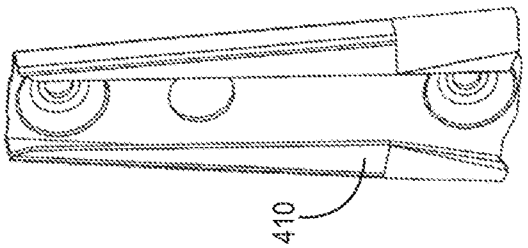
FIG. 23B is a perspective view of the opposite side of the coupling of FIG. 23A.
Figure 23A:
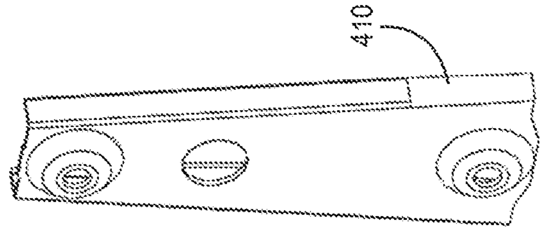
FIG. 23A is a perspective view of a coupling for connecting the back rest to the recliner mechanism.
Figure 22:
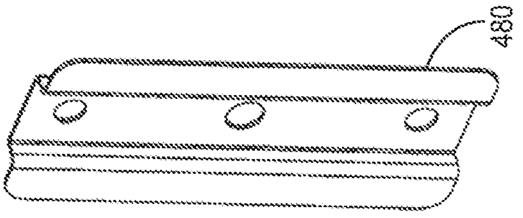
FIG. 22 is a mounting bracket of the recliners of 19*a*-19*c*.

The embodiment of FIGS. 19A-19C have brackets 480 that attach to the blowmolded arm rest form on the outside surface and have a fastener extending through the arm rest form to connect to the seat platform 407. Note the recliner mechanism is not shown in exploded view FIG. 19C. The two blowmolded arm rest forms are connected on their back side by a U-shaped plate 484 that fits into recesses 487 formed by the wall of the arm rest form. Threaded connectors 217 are imbedded into the wall to receive threaded screws or bolts 490. A wood plate 493 may be attached to provide support for an operator handle such as a handle to extend and retract the recliner. Steel interior reinforcing supports 499, configured as elongate arms, may be attached to the couplers 410 and extend into the blowmolded arm rest to provide resistance to bending. In embodiments, the reinforcing supports may be formed of other materials such as wood, fiberglass, or other rigid polymers. The reinforcing supports may be used in the arm rest forms as well, particularly where the arm rests are narrow.

Molded components can be formed of by molding methods, such as blow molding (injection blow molding, extrusion blow molding, injection stretch blow molding), and formed of different materials including, by way of example, polyethylene (PE), such as high-density polyethylene (HDPE) and low-density polyethylene (LDPE), polyvinyl chloride (PVC), polypropylene (PP), nylon, and polyethylene terephthalate (PET), thermoplastic elastomers (TPE), acrylonitrile butadiene styrene (ABS), polyphenylene oxide (PPO), nylon/polyamids (PA), polycarbonate (PC), polyester and copolyester, urethane and polyurethane, and acrylic and polystyrene. In other embodiments, molded components can be formed by differing molding methods, such as injection molding (overmolding, insert molding, cold runner injection molding, hot runner molds, rotational molding).

In embodiments, a ballast material can be added to arms 402 to provide further stability to arms 402 or chair frame 400, generally. Such ballast material can include foam, such as a density foam, sand, cement, or other material. In embodiments, ballast can be added to arms via a port or other opening in arm 402 that can include a cap or other closure structure that can be permanently or selectively closed.

Back rest form 404 is further depicted in FIGS. 17-18B. Back rest form 404 comprises a top portion 412 and a bottom portion 414 extending therefrom. Back rest form 404 further comprises a front wall portion 416, a back wall portion 418, and side wall portions 420. Front wall portion 416 and back wall portion 418 can include one or more structural recesses 421 to provide further structure, robustness, and sturdiness to sofa. Side wall portions 420 can include one or more apertures or openings 422 for use with connectors for connecting back rest form to other components of furniture structure. In embodiments, such as depicted in FIG. 19, back rest form includes bracket 410 for operably coupling back rest form 404 to another portion of frame 400, such as reclining mechanism 408 and/or arms 402. Bracket 410 can be connected to back rest form via apertures 422. Back rest form 404, or portions thereof, can be covered by padding or cushioning, such as load poly, arm fiber, and/or foam, and can then covered with fabric, leather, synthetic fabric, faux leather, microfiber, or other upholstery or covering materials.

Figure 24:
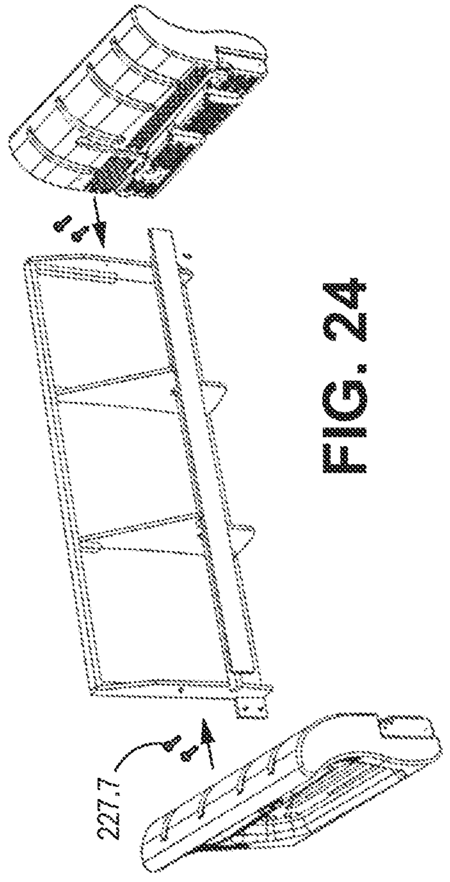
FIG. 24-28 show an advantageous assembly steps of a sofa or chair provided by the preassembled backrest frame.
Figure 25:
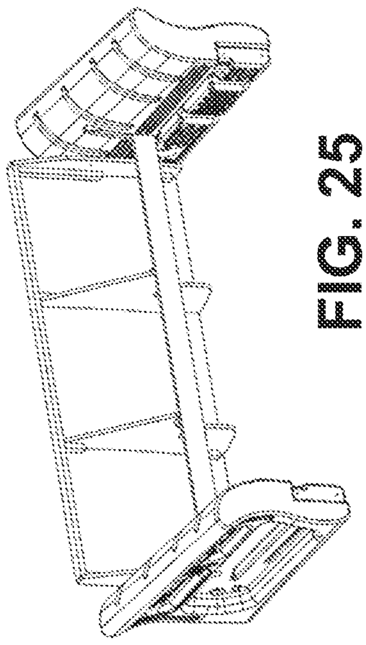
Figure 26:
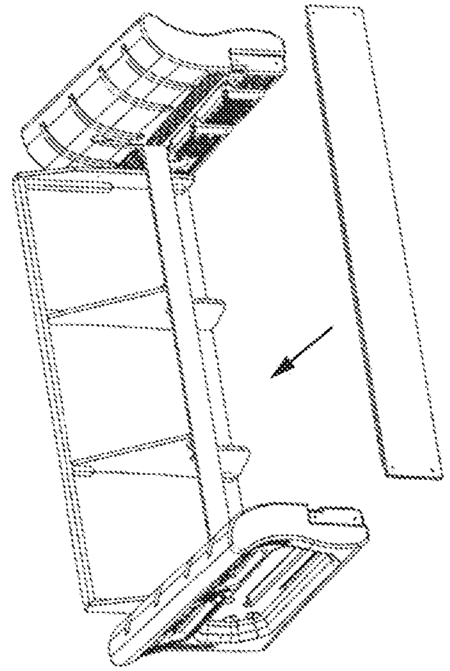
Figure 27:
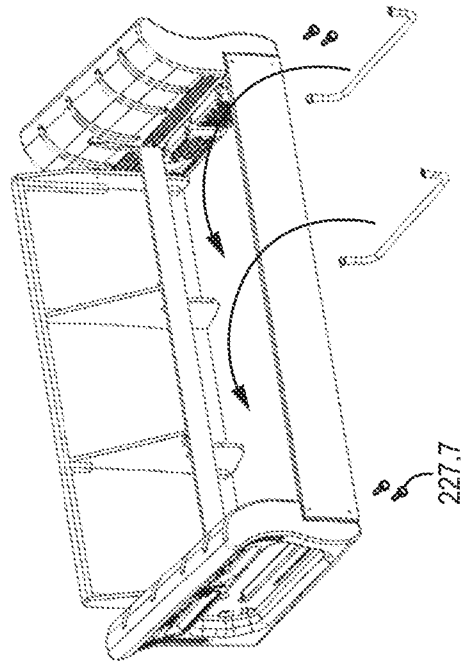
Figure 28:
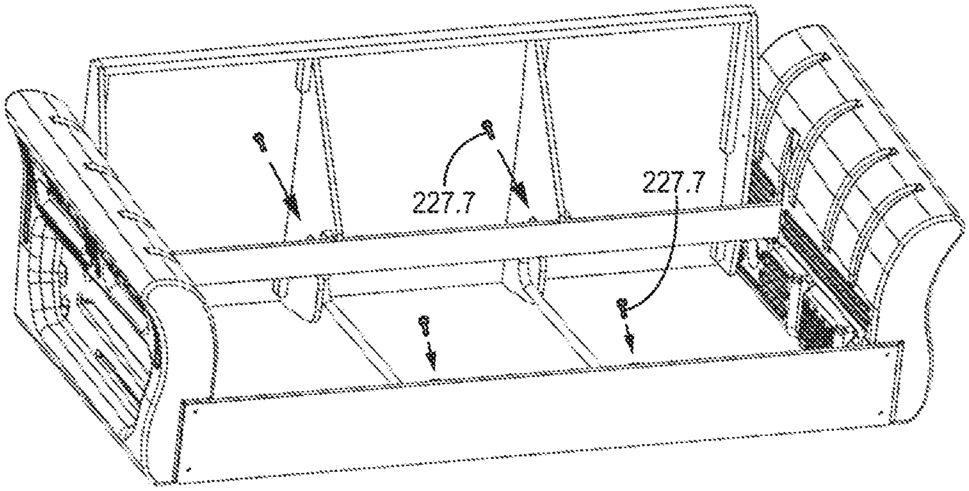

Arm rest forms 402 are further depicted in FIGS. 24-27. Arm rest forms can be formed in any furniture arm shapes including, by way of example, track, ruched, modern scroll, pad, track with nails, key, modern English, shelter, pleated, and saddle. Arm rest forms 402 can include a top 424, a bottom 426, an outside 428, an inside 430, a front 432, and a back 433. Referring to FIG. 26, inside 430 can include one or more recesses or slots 434 configured for connection with reclining mechanism 408 or a portion of a seat box. Inside 430 can further include one or more apertures or openings 436 for use with connectors for connecting arms 402 to other components of furniture structure and a projection 446 including an apertures or opening 436 for connecting arms 402 to other components of furniture structure, such as reclining mechanism 408. Referring to FIGS. 25 and 26, rear 433 can further include one or more recesses or slots 438 configured for connection with back rail 409 and one or more apertures or openings 440 for use with connectors for connecting arms to other components of furniture structure. Referring to FIG. 24, outside wall portions 428 can include one or more structural recesses 442 to provide further structure, robustness, and sturdiness to chair frame 400 and an opening 444 for coupling a portion of reclining mechanism 408 thereto—by way of example, a handle or lever (not depicted) for operating reclining mechanism 408. Referring to FIG. 27, bottom wall portion 426 can include an aperture or opening 450. Arm rest forms 402 or portions thereof can be covered by padding or cushioning, such as load poly, arm fiber, and/or foam, and can then covered with fabric, leather, synthetic fabric, faux leather, microfiber, or other upholstery or covering materials.

Figure 29:
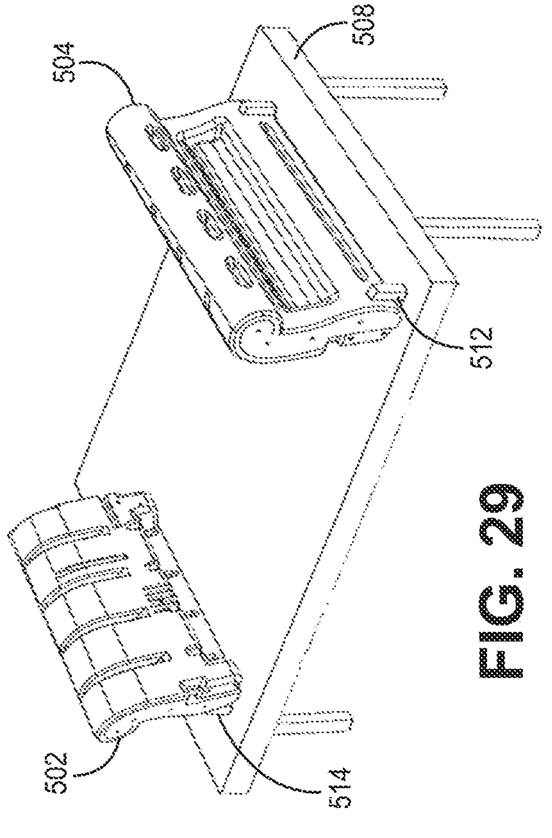
FIGS. 29-36 illustrate assembly steps where the backrest frame is constructed during the seat frame assembly.
Figure 30:
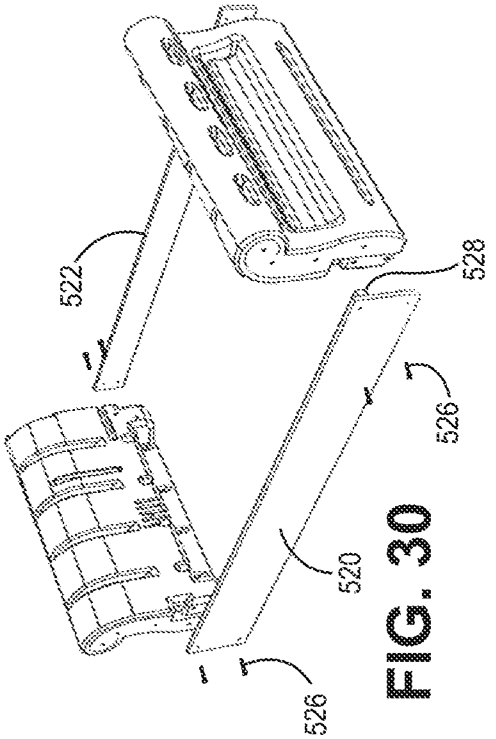
Figure 31:
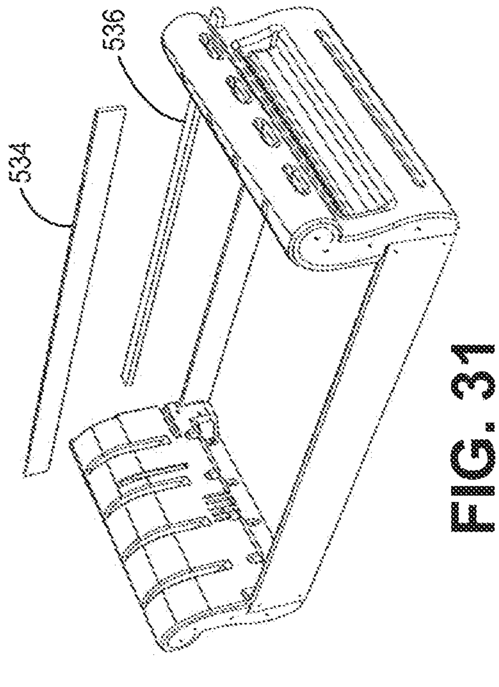
Figure 32:
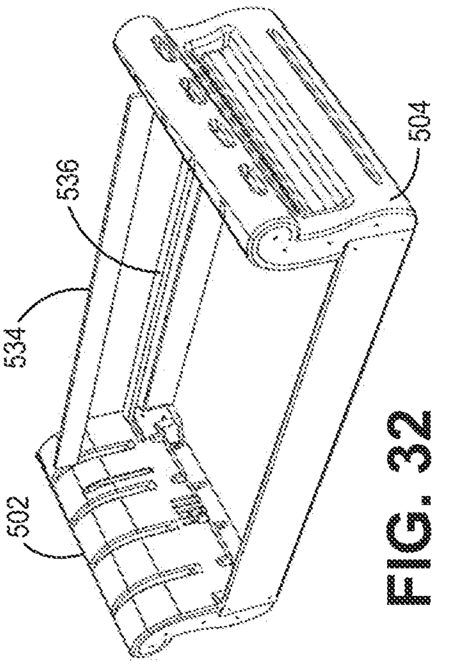
Figure 33:
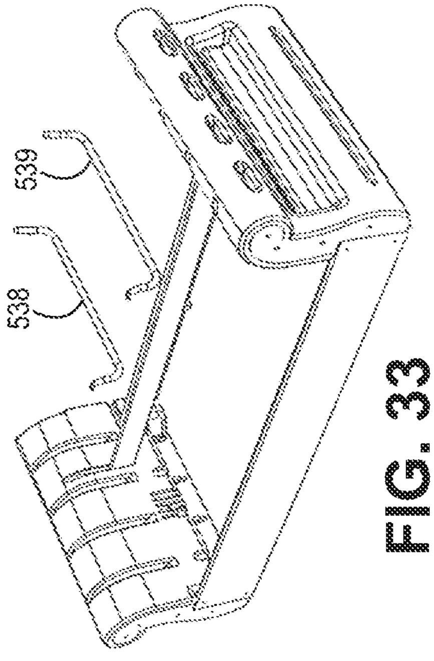
Figure 34:
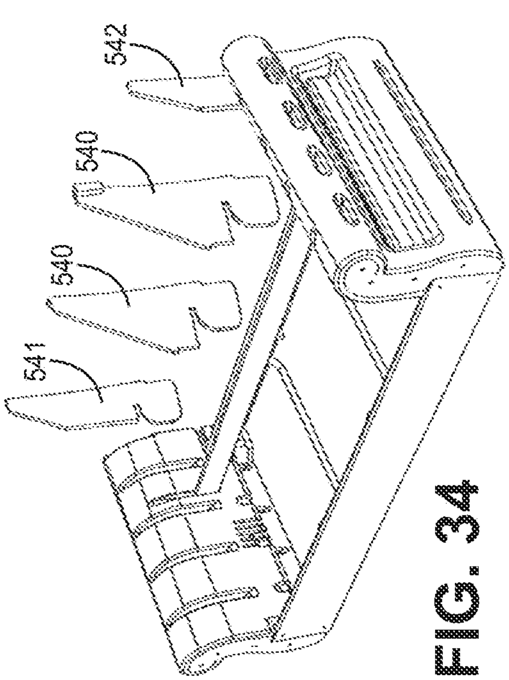
Figure 35:
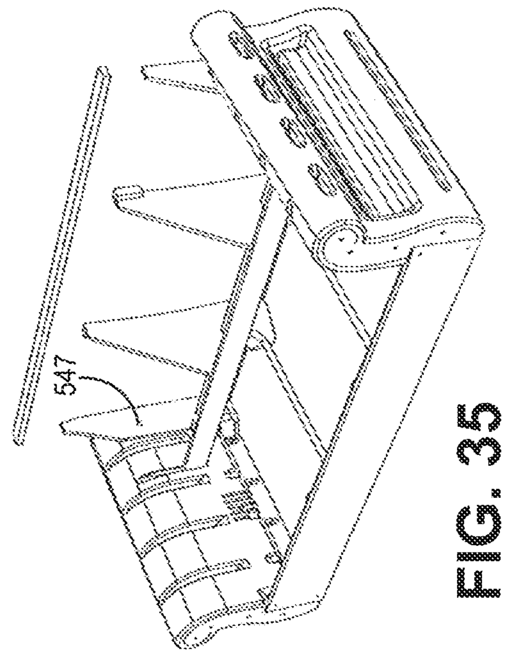
Figure 36:
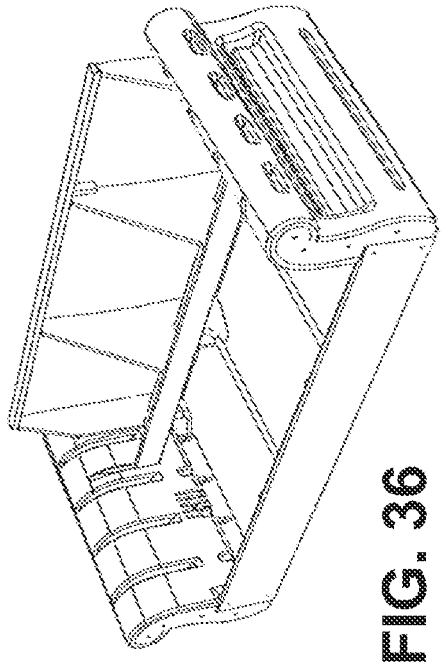

Referring to FIGS. 29-36 assembly steps of sofa frame display the advantages of utilizing blow molded arm rest forms with recesses sized for receiving ends of spanning frame members. FIG. 29 illustrates a left and right arm rest portions 502, 504 seated on jig 508 configured as a table with stops 512, 514 providing positioning of the arm rest forms with respect to each other. Each of the assembly steps that follow will typically be done in association of the jig as illustrated in FIG. 29. FIG. 30 is the arm rest forms of FIG. 29 with a lower front rail 520 and lower back rail 522 in position for attachment to the arm rest forms by way of threaded fasteners 526. The front spring rail 528 is already attached to the lower front rail. FIG. 31 shows the lower front rail and the lower back rail attached and the breast rail 534 and rear spring rail 536 in position for attachment. The breast rail to be lowered into position and the rear spring rail is pushed horizontally into position. FIG. 32 shows the breast rail and rear spring rail being slid toward their respective seating positions which may be done by striking the spanning beam members with a mallet or the like. FIG. 33 illustrates the breast rail and rear spring rail seated in their respective seating positions. In embodiments these spanning frame members are secured in their seating positions by way of interference fits between the ends of the spanning frame members and the arm rest forms. FIG. 33 illustrates the breast rail and rear spring rail seated and the seat stretchers 538, 539 before placement. The seat stretchers may be attached by way of screws driven through apertures in the ends of the seat stretchers downwardly into the front spring rail 528 and rear spring rail 536, see also FIG. 4A. FIG. 34 illustrates the seat stretchers attached and the upright back rest frame members in position for attachment. The upright frame members may be attached with staples or the like to the lower back frame member, the rear spring rail, and the breast rail. The end upright back rest frame members 541, 542 may be attached to the respective polymer arm rest forms by way of screws 547 through the frame members into the arm rest forms or into threaded inserts in the arm rest forms. FIG. 35 depicts the upright back rest frame members attached and the top back rail ready for attachment to the upright back rest frame members. Said top back rail may be attached with staples applied through the top back rail into the respective upright back rest frame members. FIG. 36 illustrates the top back rail attached and the sofa frame ready for receiving the upholstery. Various alternate steps associated with the assembly of the frame are illustrated in FIGS. 37A and 37B. Selected ones of such steps may be performed in different orders to accomplish the embodiments disclosed herein. Referring to FIG. 1B, the seat deck 33 is attached as described in WO 2018/081471 and the back rest upholstery attached as described in U.S. Pat. No. 10,299,606. This publication and patent are incorporated by reference herein. The arm rest upholstery sacks may be installed as described above.

Various direction-indicating terms are used herein as a convenient way to discuss the objects shown in the figures. It will be appreciated that many direction indicating terms are related to the instant orientation of the object being described. It will also be appreciated that the objects described herein may assume various orientations without deviating from the spirit and scope of this detailed description. Accordingly, direction-indicating terms such as "upwardly," "downwardly," "forwardly," "backwardly," should not be interpreted to limit the scope of the invention recited in the attached claims.

The following United States patents and patent publications are hereby incorporated by reference herein: U.S. Pat. And Pub. Nos. 2020/0029699, U.S. Pat. Nos. 7,070,243, 6,854,806, 6,702,391, 6,679,558, 5,582,460, 5,755,489, 5,575,533, 4,775,187, 3,877,087, 3,669,495, 3,658,382, 10,299,606, 10,117,521, 10,034,554, U.S. Pat. Nos. 9,839,295, 9,474,381, 8,777,319, 8,448,314, 8,438,716, 7,988,236, 7,806,482, and 7,438,362. The above references to U.S. patents in all sections of this application are herein incorporated by references in their entirety for all purposes. Components illustrated in such patents may be utilized with embodiments herein. Incorporation by reference is discussed, for example, in MPEP section 2163.07(B).

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

What is claimed is:

1. An upholstered chair having two blowmolded arm rest forms, a backrest and a seat connecting to and extending between each of the two blowmolded arm rest forms, each of the two blowmolded arm rest forms being hollow and having a continuous polymeric wall extending around a top, two lateral sides, a forward side, a rearward side, and a bottom side, the two blowmolded arm rest forms separated by a separation distance, wherein a rearward rail having a length greater than the separation distance extends between and is attached to the rearward sides of each of the two blowmolded arm rest forms into recesses defined on the respective rearward sides of the two blowmolded arm rest forms, wherein the chair is covered with upholstery including two arm rest sock portions.

2. The upholstered chair of claim 1, wherein the backrest and seat comprise a plurality of wood spanning members extending between the two blowmolded arm rest forms, each of the plurality of wood spanning members having a length greater than the separation distance, and wherein each of the blowmolded arm rest forms have a through slot that extends from one lateral side to the opposite lateral side of the respective arm rest form, and wherein the slot is elongate in a forward rearward direction, and wherein the seat comprises a seat deck that is stapled to each of the two blowmolded arm rest forms at the respective through slots.

3. The upholstered chair of claim 1, wherein the chair is a recliner and wherein the backrest is blowmolded and the backrest has a pair of steel brackets with respective recesses attached thereto, and wherein the seat comprises a recliner mechanism with a pair of recliner mechanism arms, wherein the recliner mechanism is attached to each of the two blow molded arm rest forms and the pair of recliner mechanism arms are attached to the pair of steel brackets.

4. The upholstered chair of claim 3, wherein the blowmolded arm rest forms each have a respective reinforcing plate on a lateral side of each of the blow molded arm rest forms.

5. The upholstered chair of claim 4, wherein the reinforcing plates are formed of metal and secure the seat deck in place.

6. An upholstered sofa comprising:

a pair of blow molded or rotationally molded polymer arm rest forms, each of the arm rest forms being hollow and having a continuous wall extending around a top, two lateral sides, a forward side, a rearward side, and a bottom side, the pair of polymer arm rest forms separated by a separation distance;

a wood breast rail, a wood rear spring rail, a lower forward wood rail, and a lower back rail extending between and connecting to each of the pair of blow molded polymer arm rest forms, each of the wood breast rail, the wood rear spring rail, the lower forward wood rail, and the lower back rail having respective lengths that are greater than the separation distance;

each of the polymer arm rest forms having an inset wall portion defining a breast rail slot and an inset wall portion defining a rear spring rail slot, the two respective breast rail slots having an interference fit with two respective ends of the breast rail, the two respective rear spring rail slots having an interference fit with two respective ends of the rear spring rail.

7. The upholstered sofa of claim 6, wherein each of polymeric arm rest forms having a recess for the lower back wood rail and each of the recesses having a threaded insert therein and secured to the continuous polymer wall of the respective arm rest form, wherein the lower back rail is attached to each of the polymeric arm rest forms with a threaded screw extending through the lower forward rail into the threaded insert.

8. The upholstered sofa of claim 6, wherein each arm rest form has a recess for receiving an end of the lower back wood rail, each respective recess defined by an inset wall portion with a rail engagement surface area of greater than 12 square inches.

9. The upholstered sofa of claim 6, wherein each arm rest form has a respective recess for receiving an end of the lower front wood rail, and each arm rest form has a rail engagement surface area at the respective recess of greater than 12 square inches.

10. The upholstered sofa of claim 6, wherein each arm rest has an internal volume defined by the continuous polymeric wall of at least 1 cubic foot.

11. The upholstered sofa of claim 6, wherein a lower margin of the lower forward wood rail is flush with lower margins of each polymer arm rest form.

12. The upholstered sofa of claim 1, wherein each of polymeric arm rest forms having a recess for a lower forward wood rail and each of the recesses having a threaded insert thereat and being secured to the continuous polymer wall and the lower forward rail is attached to each of the respective polymeric arm rest forms with a threaded screw extending through the lower forward rail into the respective threaded insert.

13. An upholstered sofa comprising a plurality of spanning wood frame members extending between and attached to a pair of spaced hollow polymer arm rest forms, each polymer arm rest form having a continuous single exterior wall, each end of the plurality of spanning wood frame members received in a form fit recess on an exterior surface of the respective exterior wall, wherein the respective continuous single exterior wall defining each recess does not extend completely around a circumference of the respective ends of the respective spanning wood frame members.

14. The upholstered sofa of claim 13, wherein a plurality of such spanning members are secured to other wood frame members that are primarily in an upright orientation at a backrest of the sofa.

15. The upholstered sofa of claim 14, further comprising a textile seat deck extending between the forward lower wood rail and a spanning wood rail of the backrest frame.

16. The upholstered sofa of claim 15, wherein each of the arm rest forms has a through slot extending through opposing lateral sides of each arm rest form, and wherein the textile seat deck has a pair of side flaps attached to each of the arm rest forms at the respective through slot.

17. The upholstered sofa of claim 14, wherein the spanning members are part of an integrated backrest frame.

18. The upholstered chair of claim 1, wherein the backrest comprises a preassembled back rest frame and a forward lower wood rail, the preassembled backrest frame attached to each of the pair of blowmolded arm rest forms and the rearward rail spanning between and attached to rearward sides of each of the pair of blowmolded arm rest forms.

19. The upholstered chair of claim 1, comprising a plurality of spanning wood frame members extending between and attached to the pair of spaced hollow polymer arm rest forms, each of the hollow polymer arm rest forms deflectable downwardly at least 1.0 inches at a top of the arm rest form without damage to the arm rest form.

20. The upholstered chair of claim 19, wherein two of the spanning frame members are attached to the respective polymer arm rest forms with a threaded fastener at each end of the two spanning frame members.

* * * * *